(12) United States Patent
Tschudy Bell et al.

(10) Patent No.: US 12,456,262 B2
(45) Date of Patent: *Oct. 28, 2025

(54) SELECTING TWO-DIMENSIONAL IMAGERY DATA FOR DISPLAY WITHIN A THREE-DIMENSIONAL MODEL

(71) Applicant: Matterport, Inc., Sunnyvale, CA (US)

(72) Inventors: Matthew Tschudy Bell, Palo Alto, CA (US); David Alan Gausebeck, Sunnyvale, CA (US); Gregory William Coombe, Mountain View, CA (US); Daniel Ford, Mountain View, CA (US); William John Brown, Redwood City, CA (US)

(73) Assignee: Costar Realty Information, Inc., Arlington, VA (US)

( * ) Notice: Subject to any disclaimer, the term of this patent is extended or adjusted under 35 U.S.C. 154(b) by 217 days.

This patent is subject to a terminal disclaimer.

(21) Appl. No.: 18/171,053

(22) Filed: Feb. 17, 2023

(65) Prior Publication Data

US 2023/0306688 A1 Sep. 28, 2023

Related U.S. Application Data

(63) Continuation of application No. 17/165,830, filed on Feb. 2, 2021, now Pat. No. 11,600,046, which is a (Continued)

(51) Int. Cl.
  *G06T 19/00* (2011.01)
  *G06T 13/80* (2011.01)
  *G06T 15/20* (2011.01)

(52) U.S. Cl.
  CPC .......... *G06T 19/003* (2013.01); *G06T 13/80* (2013.01); *G06T 15/20* (2013.01)

(58) Field of Classification Search
  CPC ........ G06T 19/003; G06T 13/80; G06T 15/20
  See application file for complete search history.

(56) References Cited

U.S. PATENT DOCUMENTS

| 4,578,757 A | 3/1986 | Strark |
| 5,056,031 A | 10/1991 | Nakano et al. |

(Continued)

FOREIGN PATENT DOCUMENTS

| EP | 3120329 A1 | 1/2017 |

OTHER PUBLICATIONS

Tan et al., Exploring 3D Navigation: Combining Speed-coupled Flying with Orbiting, 2001 (Year: 2001).*

(Continued)

*Primary Examiner* — Phong X Nguyen
(74) *Attorney, Agent, or Firm* — Ahmann Kloke LLP

(57) ABSTRACT

Systems and methods for generating three-dimensional models with correlated three-dimensional and two dimensional imagery data are provided. In particular, imagery data can be captured in two dimensions and three dimensions. Imagery data can be transformed into models. Two-dimensional data and three-dimensional data can be correlated within models. Two-dimensional data can be selected for display within a three-dimensional model. Modifications can be made to the three-dimensional model and can be displayed within a three-dimensional model or within two-dimensional data. Models can transition between two dimensional imagery data and three dimensional imagery data.

21 Claims, 14 Drawing Sheets

Related U.S. Application Data continuation of application No. 16/155,151, filed on Oct. 9, 2018, now Pat. No. 10,909,758, which is a continuation of application No. 14/219,906, filed on Mar. 19, 2014, now Pat. No. 10,163,261.

(56) References Cited

U.S. PATENT DOCUMENTS

| | | | |
|---|---|---|---|
| 5,276,785 | A | 1/1994 | Mackinlay |
| 5,347,459 | A | 9/1994 | Greenspan et al. |
| 5,552,806 | A | 9/1996 | Lenchik |
| 5,611,025 | A | 3/1997 | Lorensen |
| 5,671,381 | A | 9/1997 | Strasnick et al. |
| 5,734,884 | A | 3/1998 | Eberhard et al. |
| 5,999,881 | A | 12/1999 | Law et al. |
| 6,130,670 | A | 10/2000 | Porter |
| 6,346,938 | B1 | 2/2002 | Chan et al. |
| 6,525,731 | B1 | 2/2003 | Suits |
| 6,734,884 | B1 | 5/2004 | Berry |
| 6,907,579 | B2 | 6/2005 | Chang |
| 7,111,009 | B1 | 9/2006 | Gupta et al. |
| 7,242,408 | B1 | 7/2007 | Dunn |
| 7,933,395 | B1 | 4/2011 | Bailly |
| 8,200,594 | B1 | 6/2012 | Bleiweiss |
| 8,327,260 | B2 | 12/2012 | Bays et al. |
| 8,339,394 | B1 | 12/2012 | Lininger |
| 8,788,968 | B1 * | 7/2014 | Filip .................. G06F 3/04847 715/764 |
| 8,902,288 | B1 | 12/2014 | Fan et al. |
| 9,046,996 | B2 | 6/2015 | Gallup |
| 9,179,252 | B1 | 11/2015 | Liu |
| 9,244,940 | B1 | 1/2016 | Donsbach |
| 9,437,045 | B2 | 9/2016 | Arendash |
| 9,671,938 | B2 | 6/2017 | Seitz |
| 10,163,271 | B1 | 12/2018 | Powers et al. |
| 10,775,959 | B2 | 9/2020 | Mildrew et al. |
| 10,909,758 | B2 | 2/2021 | Bell et al. |
| 11,062,509 | B2 | 7/2021 | Bell et al. |
| D945,802 | S | 3/2022 | Bell et al. |
| 11,422,671 | B2 | 8/2022 | Mildrew et al. |
| 2002/0113865 | A1 | 8/2002 | Yano |
| 2002/0140698 | A1 | 10/2002 | Robertson et al. |
| 2003/0038799 | A1 | 2/2003 | Smith |
| 2003/0052877 | A1 | 3/2003 | Schwegler et al. |
| 2004/0041812 | A1 | 3/2004 | Roberts et al. |
| 2004/0046760 | A1 | 3/2004 | Roberts et al. |
| 2004/0085335 | A1 * | 5/2004 | Burlnyk ................. G06T 15/20 715/716 |
| 2004/0209234 | A1 | 10/2004 | Geiger |
| 2005/0125428 | A1 | 6/2005 | Kang et al. |
| 2005/0128196 | A1 | 6/2005 | Popescu et al. |
| 2005/0151751 | A1 | 7/2005 | Hong |
| 2006/0004512 | A1 | 1/2006 | Herbst |
| 2006/0041564 | A1 | 2/2006 | Jain et al. |
| 2006/0066612 | A1 | 3/2006 | Yang |
| 2006/0085123 | A1 | 4/2006 | Sugita |
| 2006/0085755 | A1 | 4/2006 | Arai |
| 2006/0114251 | A1 | 6/2006 | Miller |
| 2006/0132482 | A1 | 6/2006 | Oh |
| 2006/0176297 | A1 | 8/2006 | Kim |
| 2006/0227134 | A1 | 10/2006 | Khan et al. |
| 2007/0024612 | A1 | 2/2007 | Balfour |
| 2007/0110338 | A1 * | 5/2007 | Snavely ................. G06F 16/22 382/190 |
| 2007/0171221 | A1 | 7/2007 | Miyamoto |
| 2007/0203545 | A1 | 8/2007 | Stone et al. |
| 2008/0024484 | A1 | 1/2008 | Naimark |
| 2008/0028341 | A1 * | 1/2008 | Szeliski ............. G06F 3/04815 715/205 |
| 2008/0088621 | A1 | 4/2008 | Grimaud et al. |
| 2008/0106594 | A1 | 5/2008 | Thrun |
| 2008/0143727 | A1 | 6/2008 | Oh |
| 2008/0208547 | A1 | 8/2008 | Kim et al. |
| 2008/0247636 | A1 | 10/2008 | Davis |
| 2008/0291217 | A1 | 11/2008 | Vincent |
| 2009/0005981 | A1 | 1/2009 | Forstall |
| 2009/0079732 | A1 | 3/2009 | Fitzmaurice et al. |
| 2009/0083671 | A1 | 3/2009 | Fitzmaurice et al. |
| 2009/0129690 | A1 | 5/2009 | Marcellin |
| 2009/0153549 | A1 | 6/2009 | Lynch et al. |
| 2009/0216435 | A1 | 8/2009 | Zheng et al. |
| 2009/0274391 | A1 | 11/2009 | Arcas Blaise et al. |
| 2009/0276445 | A1 | 11/2009 | Flake et al. |
| 2009/0281728 | A1 | 11/2009 | Mishra |
| 2009/0289937 | A1 | 11/2009 | Flake et al. |
| 2010/0045666 | A1 | 2/2010 | Kommann et al. |
| 2010/0045678 | A1 | 2/2010 | Reid |
| 2010/0077311 | A1 | 3/2010 | Santoro |
| 2010/0087257 | A1 | 4/2010 | Deb |
| 2010/0171741 | A1 | 7/2010 | Brill |
| 2010/0182400 | A1 | 7/2010 | Nelson |
| 2010/0188503 | A1 | 7/2010 | Tsai |
| 2010/0201684 | A1 | 8/2010 | Yadav |
| 2010/0214284 | A1 | 8/2010 | Rieffel et al. |
| 2010/0265248 | A1 | 10/2010 | McCrae et al. |
| 2010/0268457 | A1 | 10/2010 | McCrae |
| 2010/0283781 | A1 | 11/2010 | Kriveshko et al. |
| 2010/0315416 | A1 | 12/2010 | Pretlove |
| 2011/0007962 | A1 | 1/2011 | Johnson et al. |
| 2011/0010650 | A1 | 1/2011 | Hess |
| 2011/0115885 | A1 | 5/2011 | Wernersson |
| 2011/0187723 | A1 | 8/2011 | Chen et al. |
| 2011/0199302 | A1 | 8/2011 | Tossell |
| 2011/0249757 | A1 | 10/2011 | Newton et al. |
| 2011/0283223 | A1 | 11/2011 | Vaittinen |
| 2011/0310087 | A1 | 12/2011 | Wright, Jr. et al. |
| 2011/0310088 | A1 | 12/2011 | Adabala |
| 2011/0316860 | A1 | 12/2011 | Mukai |
| 2011/0316976 | A1 | 12/2011 | Nakajima |
| 2011/0320116 | A1 | 12/2011 | DeMaio |
| 2012/0019522 | A1 | 1/2012 | Lawrence |
| 2012/0030630 | A1 | 2/2012 | Grossman et al. |
| 2012/0044247 | A1 | 2/2012 | Naimark |
| 2012/0050288 | A1 | 3/2012 | Crucs |
| 2012/0099804 | A1 | 4/2012 | Aguilera et al. |
| 2012/0116728 | A1 | 5/2012 | Shear |
| 2012/0127169 | A1 | 5/2012 | Barcay |
| 2012/0127170 | A1 | 5/2012 | Varadhan |
| 2012/0133640 | A1 | 5/2012 | Chin |
| 2012/0139915 | A1 | 6/2012 | Muikaichi |
| 2012/0154446 | A1 | 6/2012 | Adams et al. |
| 2012/0155744 | A1 | 6/2012 | Kennedy |
| 2012/0209574 | A1 | 8/2012 | Moreau et al. |
| 2012/0316441 | A1 | 12/2012 | Toma et al. |
| 2012/0327184 | A1 | 12/2012 | Zhu et al. |
| 2013/0009954 | A1 | 1/2013 | Ofek |
| 2013/0016896 | A1 | 1/2013 | Seida |
| 2013/0044139 | A1 | 2/2013 | Hernandez |
| 2013/0085823 | A1 | 4/2013 | Gibson |
| 2013/0135292 | A1 | 5/2013 | Lee et al. |
| 2013/0179841 | A1 * | 7/2013 | Mutton ................. G06T 19/003 715/850 |
| 2013/0187905 | A1 | 7/2013 | Vaddadi et al. |
| 2013/0187952 | A1 | 7/2013 | Berkovich |
| 2013/0207963 | A1 | 8/2013 | Stirbu |
| 2013/0271457 | A1 | 10/2013 | Haswell |
| 2013/0271462 | A1 | 10/2013 | Frank |
| 2013/0300656 | A1 | 11/2013 | Roegelein |
| 2013/0321392 | A1 | 12/2013 | Van Der et al. |
| 2013/0321395 | A1 | 12/2013 | Chen et al. |
| 2013/0321397 | A1 | 12/2013 | Chen |
| 2013/0321401 | A1 | 12/2013 | Piemonte et al. |
| 2013/0342533 | A1 * | 12/2013 | Bell ..................... G06T 19/003 345/420 |
| 2014/0002439 | A1 | 1/2014 | Lynch |
| 2014/0002440 | A1 * | 1/2014 | Lynch .................... G06T 19/00 345/619 |
| 2014/0062998 | A1 | 3/2014 | Ofstad |
| 2014/0071119 | A1 | 3/2014 | Piemonte et al. |
| 2014/0093187 | A1 | 4/2014 | Yehezkel et al. |
| 2014/0095122 | A1 | 4/2014 | Appleman |
| 2014/0104280 | A1 | 4/2014 | Ofstad |
| 2014/0218360 | A1 | 8/2014 | Dalgaard Larsen |

(56) References Cited

U.S. PATENT DOCUMENTS

| | | | |
|---|---|---|---|
| 2014/0240318 A1* | 8/2014 | Coombe | G06T 19/003 345/427 |
| 2014/0253541 A1 | 9/2014 | Schmidt | |
| 2014/0314322 A1 | 10/2014 | Snavely | |
| 2014/0320484 A1 | 10/2014 | Rane | |
| 2015/0009327 A1 | 1/2015 | Love | |
| 2015/0049086 A1 | 2/2015 | Morato et al. | |
| 2015/0085068 A1 | 3/2015 | Becker | |
| 2015/0130894 A1 | 5/2015 | Holzer | |
| 2015/0154798 A1 | 6/2015 | Simpson et al. | |
| 2015/0213642 A1 | 7/2015 | Tange et al. | |
| 2015/0269785 A1 | 9/2015 | Bell | |
| 2015/0293354 A1 | 10/2015 | Oishi | |
| 2015/0335303 A1 | 11/2015 | Chandelier et al. | |
| 2016/0012160 A1 | 1/2016 | Mohacsi et al. | |
| 2016/0127690 A1 | 5/2016 | Kaehler et al. | |
| 2016/0210788 A1 | 7/2016 | Kasahara | |
| 2016/0267067 A1 | 9/2016 | Mays | |
| 2016/0328373 A1 | 11/2016 | Rhoades | |
| 2017/0075536 A1 | 3/2017 | Cho et al. | |
| 2017/0352196 A1 | 12/2017 | Chen | |
| 2019/0050137 A1 | 2/2019 | Mildrew et al. | |
| 2019/0051050 A1 | 2/2019 | Bell et al. | |
| 2019/0244419 A1 | 8/2019 | Bell et al. | |
| 2021/0158618 A1 | 5/2021 | Bell et al. | |
| 2021/0335034 A1 | 10/2021 | Bell et al. | |
| 2022/0264239 A1 | 8/2022 | Kanemaru | |
| 2023/0306688 A1* | 9/2023 | Bell | G06T 19/003 |

OTHER PUBLICATIONS

Non-Final Office Action for U.S. Appl. No. 17/820,237 dated Jan. 4, 2024, 7 pages.
WilloxH: "Microsoft Photosynth," Jul. 27, 2006, Retrieved from the Internet: URL:https://www.youtube.com/watch?v=p16frKJLVi0 [retrieved on Dec. 2, 2015], 1 page.
Yan, Wei et al., "Integrating BIM and Gaming for Real-Time Interactive Architectural Visualization," Jul. 2011, Automation in Construction, vol. 20, No. 4, pp. 446-458.
IMARIS, Quick Start Tutorials, 2009.
Non-Final Office Action for U.S. Appl. No. 18/152,437 dated Jan. 29, 2025, 21 pages.
Anand et al., "Contextually guided semantic labelling and search for three-dimensional point clouds," 2013 (Year: 2013).
Notice of Allowance for U.S. Appl. No. 17/820,237, dated May 8, 2024, 8 pages.
Vaaraniemi et al., "Enhancing the visibility of labels in 3D navigation maps," 2013 (Year: 2013).
Bourke, "Interpolation Methods," 1999, available at http://paulbourke.net/miscellaneous/interpolation/, pp. 1-12.
Bredif, Image-Based Rendering of LOD1 3D City Models for Traffic-Augmented Immersive Street-View Navigation, 2013 (Year: 2013).
European Office Action from EP Application Serial No. 15764342.0, dated Oct. 28, 2016, 2 pages.
Extended European Search Report Issued in EP Patent application No. 15764342.0 dated Aug. 11, 2017, 9 Pages.
Final Office Action for U.S. Appl. No. 17/165,830 dated Apr. 19, 2022, 14 pages.
Final Office Action for U.S. Appl. No. 13/925,772 dated Aug. 16, 2016, 41 pages.
Final Office Action for U.S. Appl. No. 13/925,772 dated May 5, 2015, 31 pages.
Final Office Action for U.S. Appl. No. 14/219,906 dated Jun. 21, 2016, 35 pages.
Final Office Action for U.S. Appl. No. 14/219,906 dated Oct. 19, 2017, 43 pages.
Final Office Action for U.S. Appl. No. 15/199,853 dated Apr. 25, 2018, 31 pages.
Final Office Action for U.S. Appl. No. 16/155,151 dated May 4, 2020, 19 pages.
Final Office Action for U.S. Appl. No. 16/386,910 dated Sep. 17, 2020, 13 pages.
Fitzmaurice, George et al., "Safe 3D Navigation," Feb. 2008, I3D '08, Proceedings of the 2008 Symposium on Interactive 3D Graphics and Games, pp. 7-15.
Geraerts, Roland, "Camera Planning in Virtual Environments Using the Corridor Map Method," Nov. 2009, Second International Workshop on Motion in Games, pp. 194-209.
Hsieh, Chi-Chang et al., "Photo Navigator," 2008, MM '08 Proceedings of the 16th ACM international conference on Multimedia, pp. 419-428.
International Search Report & Written Opinion for International Patent Application Serial No. PCT/US15/20453, dated Jun. 25, 2015, 11 pages.
Lala et al., "Towards a Virtual Environment for Capturing Behavior in Cultural Crowds", 2011 (Year: 2011).
McCrae et al., Multiscale 3D Navigation, 2009 (Year: 2009).
Non-Final Office Action for U.S. Appl. No. 13/925,772 dated Feb. 3, 2016, 37 pages.
Non-Final Office Action for U.S. Appl. No. 13/925,772 dated Nov. 28, 2014, 10 pages.
Non-Final Office Action for U.S. Appl. No. 14/219,906 dated Apr. 4, 2018, 22 pages.
Non-Final Office Action for U.S. Appl. No. 14/219,906 dated Nov. 18, 2015, 29 pages.
Non-Final Office Action for U.S. Appl. No. 14/219,906, dated Mar. 2, 2017, 40 pages.
Non-Final Office Action for U.S. Appl. No. 15/199,853, dated Oct. 31, 2017, 31 pages.
Non-Final Office Action for U.S. Appl. No. 15/272,337 dated Feb. 2, 2018, 66 pages.
Non-Final Office Action for U.S. Appl. No. 15/722,269 dated Oct. 17, 2018, 55 pages.
Non-Final Office Action for U.S. Appl. No. 16/155, 151 dated Oct. 31, 2019, 18 pages.
Non-Final Office Action for U.S. Appl. No. 16/162,683 dated Dec. 30, 2019, 18 pages.
Non-Final Office Action for U.S. Appl. No. 16/386,910 dated Apr. 21, 2020, 11 pages.
Non-Final Office Action for U.S. Appl. No. 17/165,830 dated Nov. 5, 2021, 7 pages.
Non-Final Office Action for U.S. Appl. No. 17/372,333 dated Apr. 25, 2022, 47 pages.
Notice of Allowance for U.S. Appl. No. 13/925,772, dated Jun. 1, 2017, 32 pages.
Notice of Allowance for U.S. Appl. No. 14/219,906 dated Jul. 10, 2018, 55 pages.
Notice of Allowance for U.S. Appl. No. 15/272,337 dated Jul. 17, 2018, 46 pages.
Notice of Allowance for U.S. Appl. No. 15/722,269 dated Jan. 29, 2019, 24 pages.
Notice of Allowance for U.S. Appl. No. 16/155,151 dated Oct. 1, 2020, 13 pages.
Notice of Allowance for U.S. Appl. No. 16/162,683 dated May 14, 2020, 20 pages.
Notice of Allowance for U.S. Appl. No. 17/021,848 dated Apr. 22, 2022, 11 pages.
Notice of Allowance for U.S. Appl. No. 17/165,830 dated Nov. 4, 2022, 9 pages.
Notice of Allowance for U.S. Appl. No. 17/372,333 dated Dec. 9, 2022, 2 pages.
Notice of Allowance for U.S. Appl. No. 17/372,333, dated Dec. 12, 2022, 2 pages.
Notice of Allowance for U.S. Appl. No. 17/372,333, dated Sept. 1, 2022, 9 pages.
Office Action for U.S. Appl. No. 13/925,772 dated Feb. 3, 2016, 37 pages.
Office Action for U.S. Appl. No. 13/925,772 dated Nov. 28, 2014, 10 pages.

(56) References Cited

OTHER PUBLICATIONS

Raja et al., "Dynamic Inversion-Based Nonlinear Aiming Point Guidance of Unmanned Aerial Vehicles for Reactive Obstacle Avoidance", 2013 (Year: 2013).
Snavely et al., "Photo Tourism: Exploring Photo Collections in 3D", 2006, SIGGRAPH '06 ACM SIGGRAPH, pp. 835-846.
Snavely et al., "Photo Tourism: Exploring Photo Collections in 3D", SIGGRAPH '06 ACM SIGGRAPH, 2006, pp. 835-846.
Snavely, Noah et al., "Photo Tourism: Exploring Photo Collections in 3D," 2006, SIGGRAPH '06 ACM SIGRRAPH, pp. 835-846.
Tu Wien Institute of Computer Engineering, "Computer-Assisted Animation," 2002, available at https://www.cg.tuwien.ac.at/courses/Animation/B_Computer_Assisted_Animation.pdf, pp. 1-20.
Final Office Action for U.S. Appl. No. 18/152,437 dated Jul. 31, 2025, 20 pages.

\* cited by examiner

SELECTING TWO-DIMENSIONAL IMAGERY DATA FOR DISPLAY WITHIN A THREE-DIMENSIONAL MODEL

CROSS-REFERENCE TO RELATED APPLICATIONS

This application is a continuation of and claims priority to U.S. patent application Ser. No. 17/165,830, filed on Feb. 2, 2021, entitled "Selecting Two-Dimensional Imagery Data for Display Within a Three-Dimensional Model," issued as U.S. Pat. No. 11,600,046, which is a continuation of and claims priority to U.S. patent application Ser. No. 16/155,151, filed on Oct. 9, 2018, entitled "Selecting Two-Dimensional Imagery Data for Display Within a Three-Dimensional Model," issued as U.S. Pat. No. 10,909,758, which is a continuation of and claims priority to U.S. patent application Ser. No. 14/219,906, filed on Mar. 19, 2014, entitled "Selecting Two-Dimensional Imagery Data for Display Within a Three-Dimensional Model," issued as U.S. Pat. No. 10,163,261. The entirety of the aforementioned applications are incorporated by reference herein.

TECHNICAL FIELD

This disclosure generally relates to systems and methods for selecting two-dimensional data for display within a three-dimensional model, and more particularly to transitioning between rendering three-dimensional imagery data of a three-dimensional model and rendering two-dimensional imagery data associated with the three-dimensional model.

BACKGROUND

Interactive, first-person three-dimensional immersive environments are becoming increasingly popular. In these environments, a user is able to navigate through a virtual space. Examples of these environments include first person video games and tools for visualizing three-dimensional models of terrain. Aerial navigation tools allow users to virtually explore urban areas in three dimensions from an aerial point of view. Panoramic navigation tools (e.g., street views) allow users to view multiple 360-degree panoramas of an environment and to navigate between these multiple panoramas with a visually blended interpolation.

Three-dimensional immersive environments can be generated based on manual user input or based on automatic three dimensional reconstruction systems. Manual generation of these environments is often costly and time consuming. Three-dimensional immersive environments can also have errors or holes. With these developments, there is a consequential need to view and navigate these three-dimensional models on an array of computing devices.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems, methods, and apparatuses are disclosed herein to facilitate generating correlated models comprising three-dimensional (3D) reconstructions of captured content and two-dimensional (2D) captured content. A 3D model can be generated based on sensor data (e.g., 3D sensors), 2D image data, and the like. The 3D model can comprise positional data for rendering 3D images. 2D images can be correlated and oriented with the 3D model.

Models can be rendered via an interface. Rendering of the models can transition between rendering 3D data, 2D data, or a combination of 3D and 2D data. 2D data can be selected for transitioning to based on selection criteria. Selection criteria can comprise a point of view associated with a rendered model, analysis of the 2D data or 3D data, or navigational data. Notifications can be generated to signify whether rendering can alternate between rendering 3D data, 2D data, or a combination of 3D and 2D data. Alternating between rendering 3D data, 2D data, or a combination of 3D and 2D data can include smooth transitioning, panning, snap transitions, and the like.

A set of user tools can facilitate manipulation of 3D and 2D models. User tools can allow for adding user generated content, removing portions of captured content, manipulating a rendering, generating summaries, and the like.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
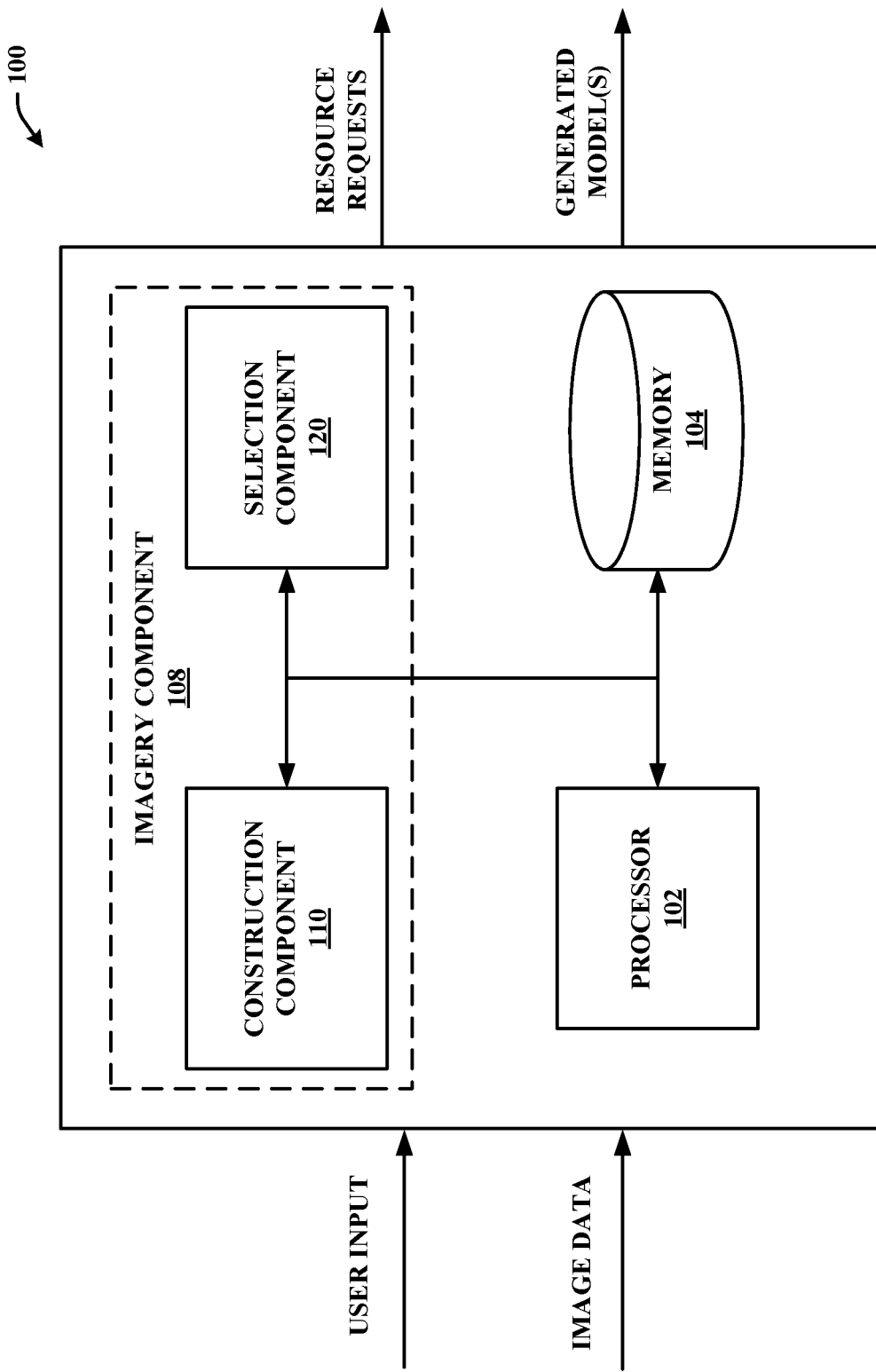
FIG. 1 illustrates a high-level block diagram of an example system that can alternate rendering 3D images of a 3D model and rendering 2D imagery data in accordance with certain embodiments of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

Terms such as "user equipment," "user equipment device," "mobile device," "user device," "handset," or terms representing similar terminology can refer to a device utilized by a subscriber or user to receive data, convey data, control, voice, video, sound, models, gaming, and the like. The foregoing terms are utilized interchangeably herein and with reference to the related drawings.

Furthermore, the terms "user," "subscriber," "customer," "consumer," "end user," and the like are employed interchangeably throughout, unless context warrants particular distinctions among the terms. It should be appreciated that such terms can refer to human entities, human entities represented by user accounts, or automated components supported through artificial intelligence (e.g., a capacity to make inference based on complex mathematical formalisms), which can provide simulated vision, sound recognition and so forth.

Digital 3D models can be generated based on 2D sensory data, sensory data in combination with raw 2D data, computer generated positional data, and the like. In an aspect, data used to generate 3D models can be collected from scans (e.g., utilizing sensors) of real-world scenes, spaces (e.g., houses, office spaces, outdoor spaces, etc.), objects (e.g., furniture, decorations, goods, etc.), and the like. Data can also be generated based on computer implemented 3D modeling systems.

3D models can comprise data representing positions, geometric shapes, curved surfaces, and the like. For example, a 3D model can comprise a collection of points represented by 3D coordinates, such as points in a 3D Euclidean space. The collection of points can be associated with each other (e.g., connected) by geometric entities. For example, a mesh comprising a series of triangles, lines, curved surfaces (e.g., non-uniform rational basis splines ("NURBS")), quads, n-grams, or other geometric shapes can connect the collection of points. In an aspect, portions of the mesh can comprise image data describing texture, color, intensity, and the like. In embodiments, captured 2D images (or portions thereof) can be associated with portions of the mesh.

It is noted that the terms "3D model," "3D object," "3D display," "3D reconstruction," "3D rendering," "3D construct," and the like are employed interchangeably throughout, unless context warrants particular distinctions among the terms. It should be appreciated that such terms can refer to data representing an object, space, scene, and the like in three dimensions, which may or may not be displayed on an interface. In an aspect, a computing device, such as a graphic processing unit (GPU) can generate, based on the data, performable/viewable content in three dimensions. The terms "3D data," "3D imagery data," and like are employed interchangeably throughout, unless context warrants particular distinctions among the terms and can refer to data utilized to generate a 3D model, data describing a 3D model, data describing perspectives or points of view of a 3D model, capture data (e.g., sensory data, images, etc.), meta-data associated with a 3D model, and the like.

In another aspect, terms such as "navigational position," "current position," "user position," and the like are employed interchangeably throughout, unless context warrants particular distinctions among the terms. It should be appreciated that such terms can refer to data representing a position in a 3D model during user navigation and the like.

Embodiments described here can reference a model in a particular mode or view, such as a walking mode, orbital mode, floor plan mode, 3D mode, 2D mode, or the like. However, it is appreciated that each mode can comprise a distinct model. Accordingly, a mode can be defined as a distinct model or a model in a particular mode with determined available features.

It is noted that the terms "2D model," "2D image(s)," and the like are employed interchangeably throughout, unless context warrants particular distinctions among the terms. It should be appreciated that such terms can refer to data representing an object, space, scene, and the like in two dimensions, which may or may not be displayed on an interface. The terms "2D data," "2D imagery data," and like are employed interchangeably throughout, unless context warrants particular distinctions among the terms and can refer to data describing a 2D image (e.g., meta-data), capture data associated with a 2D image, a 2D image, a representation of a 2D image, and the like. In an aspect, a computing device, such as a GPU, can generate, based on the data, performable/viewable content in two dimensions.

In another aspect, 2D models can be generated based on captured image data, 3D imagery data, and the like. In embodiments, a 2D model can refer to a 2D representation of a 3D model, real-world scene, 3D object, or other 3D construct. As an example, a 2D model can comprise a 2D image, a set of 2D images, a panoramic 2D image, a set of panoramic 2D images, 2D data wrapped onto geometries, or other various 2D representations of 3D models. It is noted that a 2D model can comprise a set of navigation controls.

A 3D modeling system can generate a rendering of a 3D model. In an aspect, the 3D model can be rendered in one or more modes as described in more detail below. For example, a 3D model can be rendered in a walking mode, orbital mode, flying mode, floor plan mode, and the like. In an aspect, a user can provide input to a 3D modeling system and the 3D modeling system can facilitate navigation of the 3D modeling system. As used herein, navigation of a 3D modeling system can include altering a field of vision, as described in more detail below. For example, a field of vision can rotate about a viewpoint (e.g. an axis or pivot point), alternate between viewpoints, enhance a region of a model, alter a size of a region of a model (e.g., "zoom in," or "zoom out," etc.), and the like.

In accordance with one or more embodiments described in this disclosure, a 3D imaging system can generate a 3D model and select 2D images for display. A construction component can generate a 3D model, such as a model based on 3D imagery data comprising, for example, image data in combination with, point cloud data, 3D mesh data, volumetric rendering data, surfel cloud data, cartoon rendering data, and the like. It is noted that a 3D model can comprise 2D images (color, textures, etc.) and positional data. As used herein, 2D imagery data can comprise raw 2D image data, flat image data, field of view data, or viewpoint data that represents a viewpoint (e.g., capture position) for 2D images.

A selection component can facilitate selecting the 2D imagery data for display. For example, the selection component can select a 2D image for display based on selection criteria. In another aspect, the selection component can select, based on 3D imagery data and associated viewpoints of a 3D model (e.g., such as a viewpoint of the 3D model or a selected position of the 3D model), 2D imagery for display in a 2D mode. The selection component can pre-select 2D images based on associated viewpoints and 3D position data or can select 2D images at a run time. A display control component can render or manipulate a 3D model. The display control component can facilitate navigation in or about a model and altering modeling modes, dimensions, and the like. In another aspect, the display control component can facilitate a transition between rendering a 3D model and rendering 2D images In accordance with other embodiments described in this disclosure, a 3D modeling method is described herein. The method can include generating a 3D model based on 2D imagery data and 3D imagery data. For example, captured 2D images can be associated with coordinates of a 3D model based on image or feature matching techniques such as bundle adjustment and other photogrammetry techniques, location data, data from additional sensors such as Inertial Measurement Units (IMUs), and the like. In some embodiments, the method can comprise navigating a 3D model and providing 2D images within the 3D model. The method can include selecting 2D images for display within a 3D model, in conjunction with a 3D model, or in place of a 3D model. Selecting the 2D images for display can comprise selecting a 2D image based on a navigation position within a 3D model, a viewpoint of a 3D model, user input, and the like.

In another aspect, embodiments can comprise alternating between models or modes. For example, a method can render a 3D model in a first mode and can switch to a second mode. In another example, a 3D walkthrough mode can be rendered, such as via an interface, and, in response to a trigger, a 2D panorama or other 2D image can be displayed. In an aspect, the field of view can be correlated during switching between modes. For example, a 3D walkthrough mode can be rendered such that a particular field of view is displayed. Switching to a 2D walkthrough mode can comprise rendering a 2D model such that the same or similar field of view is displayed. It is noted that a 2D walkthrough mode can be constrained by properties of 2D images. For example, in a 2D walkthrough mode, navigation can be limited to navigating between determined viewpoints (e.g., points corresponding to capture points) and rotating around in various axes while remaining stationary on another axis or axes.

The above-outlined embodiments are now described in more detail with reference to the drawings, wherein like reference numerals are used to refer to like elements throughout. In the following description, for purposes of explanation, numerous specific details are set forth in order to provide a thorough understanding of the embodiments. It may be evident, however, that the embodiments can be practiced without these specific details. In other instances, well-known structures and devices are shown in block diagram form in order to facilitate describing the embodiments.

In implementations, the components described herein can perform actions online or offline. Online/offline can refer to states identifying connectivity between one or more components. In general, "online" indicates a state of connectivity, while "offline" indicates a disconnected state. For example, in an online mode, models can be streamed from a first device (e.g., server) to a second device (e.g., user device), such as streaming raw model data or rendered models. In another example, in an offline mode, models can be generated and rendered on one device (e.g., user device), such that the device does not receive data or instructions from a second device (e.g., server).

While the various components are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other. It is noted that while media items are referred to herein, the systems and methods of this disclosure can utilize other content items.

Referring now to FIG. 1, a system 100 is depicted. System 100 can select 2D imagery data corresponding to a generated 3D model, in accordance with various embodiments disclosed herein. Embodiments disclosed herein, for example, generate a 3D model, position 2D imagery data based on the 3D model, select 2D images to display based on information association with the 3D model, render the 3D model, and the like. Such embodiments can enable additional features in 3D modeling systems, improve user satisfaction, and provide other benefits that will be apparent herein.

System 100 can primarily include a memory 104 that stores computer executable components and a processor 102 that executes computer executable components stored in the memory 104. It is to be appreciated that the system 100 can be used in connection with implementing one or more of the systems or components shown and described in connection with other figures disclosed herein. It is noted that all or some aspects of system 100 can be comprised in larger systems such as servers, computing devices, smart phones, tablets, personal computers, cameras, and the like. As depicted, system 100 can include communicably coupled components comprising an imagery component 108 (which can generate 3D models and may select appropriate 2D data to show based on information associated with the 3D model). Imagery component 108 can primarily comprise construction component 110 (which can generate 3D models and 2D models) and selection component 120 (which can select 2D imagery data based on 3D imagery data and associated viewpoints or on navigational data).

System 100 can receive input to facilitate generation of 3D models comprising 3D imagery data and 2D imagery data. For example, system 100 can receive raw 2D imagery data, sensory data, 3D imagery data, and the like. In some embodiments, system 100 can receive a fully or partially generated 3D model or 2D model. It is noted that system 100 can receive input, for example, from a capturing device, sensors, a memory store (e.g., database, storage medium, cloud storage, memory 104, etc.), user input, and the like.

Imagery component 108 can facilitate generation of correlated models. Correlated models can comprise 3D models with correlated 2D imagery or video content, 2D models with correlated 3D imagery or video content, and the like. In some embodiments, construction component 110 can generate a 3D model based on 3D imagery data, such as a set of points, a geometric mesh, color data, and the like. In an aspect, construction component 110 can generate 2D models based on 2D images, 3D imagery data, location data, and the like.

In embodiments, construction component 110 can generate 3D models based on 3D imagery data, capturing data (e.g., camera speed, rotation, camera type, etc,), position data, and the like. In an aspect, construction component 110 can determine position data based on a global satellite positioning (GPS) system, triangulation (e.g., access point triangulation), gyroscope data, motion sensors, accelerometer (e.g. a 3-axis accelerometer), IMU, trilateration system (e.g., GPS or a local arrangement of signal emitters), visual odometry calculation, physical odometry measurement, augmented reality markers, or any variety of a combination of the aforementioned or other technologies. Physical measurements of absolute scale may also be taken. The time of each 3D scene capture may also be determined. Rough estimation of camera movement may be computed using various methods such as optical flow or 2D or 3D feature tracking. This information may be used to provide additional clues about alignment when determining automatic alignment of 3D scenes.

In another aspect, construction component 110 can generate a composite of 3D images or a 3D mesh based on sensory data, image recognition, and the like. It is noted that embodiments allow for utilization of various techniques to generate the 3D model. Likewise, 2D models can be generated, for example, based on stitching of 2D images, overlaying 2D images onto a 3D model, and the like.

Construction component 110 can determine positions of objects, barriers, flat planes, and the like. For example, based on 3D imagery data, construction component 110 can identify barriers, walls, objects (e.g., counter tops, furniture, etc.), or other features of the 3D imagery data. In an aspect, objects can be defined as solid objects such that they cannot be passed through when rendered (e.g., during navigation, transitioning between modes and the like). Defining objects as solid can facilitate aspects of navigation of a model by a user interacting with system 100. For example, a user can navigate through a 3D model of an interior living space. The living space can include walls, furniture, and other objects. As a user navigates through the model, they can be prevented from passing through a wall or other object and movement may also be constrained according to one or more configurable constraints (e.g., viewpoint kept at a specified height above a surface of the model or a defined floor). In an aspect, the constraints can be based at least in part on a mode (e.g., walking mode) or type of a model. It is noted that, in other embodiments, objects can be defined as not solid objects such that objects can be passed through (e.g., during navigation, transitioning between modes and the like).

In embodiments, construction component 110 can determine a set of viewpoints, rotational axes, and the like. For example, construction component 110 can determine viewpoints based on camera poses, location data (e.g., relative location of one or more capturing devices or captured content), and the like. In an aspect, a viewpoint can comprise a viewpoint of a 2D image, a viewpoint of a 3D image or model, and the like. Viewpoints can contain position, orientation, and/or field of view information.

In embodiments, construction component 110 can correlate 2D imagery data and 3D imagery data. For example, construction component 110 can determine that 2D imagery data corresponds to a position associated with a 3D model, such as a coordinate of 3D planar space represented as an (X, Y, Z) coordinate, where X represents a position on a first plane, Y represents a position of a second plane, and Z represents a position of a third plane. The position may also include information about orientation (e.g., a quaternion in an (X, Y, Z) coordinate system). Additional data may localize the position of different parts of the 2D imagery data within the 3D model. It is noted that various other naming conventions or positioning techniques can be utilized, such as defining a position relative to an origin point). In some embodiments, construction component 110 can determine positions of corners of a 2D image in a 3D model, or the position, orientation, and field of view of a camera that captured a 2D image or 2D panoramic image. Such determinations may be used to create 2D imagery data for the 2D image.

Selection component 120 can select 2D imagery data to be associated with positions or viewpoints associated with 3D imagery data or to be associated with navigational positions. In another aspect, selection component 120 can generate sets of 2D imagery data and can associate the 2D imagery data with respective 3D imagery data and associate viewpoints or navigational positions. In embodiments, selection can occur during navigation of a model, during rendering of a model, prior to rendering a model, prior to navigation of a model, and the like. For example, selection component 120 can select 2D imagery data based on a current navigation position (e.g., position of a user) during a live navigation process. In another example, selection component 120 can select 2D imagery data for a set of possible navigation positions in the 3D model prior to navigation of a model to generate a set of selected 2D images respectively associated with the set of possible positions in the 3D model, such as in a predetermined or precomputed fashion. In an aspect, selection component 120 can select 2D images from 2D imagery data utilized to construct (e.g., via construction component 110) a 3D model, 2D imagery data capturing during capturing of 3D imagery data, 2D imagery data uploaded by a user, or 2D imagery data otherwise received by selection component 120.

Selection component 120 can select appropriate 2D images based on a selection criterion or selection criteria. Selection criteria can comprise a score of a content match, user input, an image quality metric, capture position data (e.g., position of a capturing device), angle of view, user input, metadata, and the like. For example, selection component 120 can compare 2D imagery data to 3D imagery data to generate a score. In an aspect, a 2D image can comprise a panoramic image of a particular scene. The panoramic image can be compared to an image of a 3D model where the image of the 3D model corresponds to the panoramic rendering generated from a particular viewpoint within the 3D model. In another aspect, selection component 120 can compare 2D images to select a 2D image as appropriate. For example, given a position or viewpoint in a 3D model, selection component 120 can select one or more images from a set of 2D images (e.g., a set of panoramic 2D images) associated with the position or viewpoint in the model. One or more 2D images can be selected as a "best-fit" image, a highest quality image, an image having a shortest distance (navigational or actual distance), or the like. Best-fit images can relate to an image selected based on a selection criterion that attempts to select an image to maximize one or more metrics. The selected 2D image of the set of images can be stored for later use or displayed upon selection.

In an embodiment, selection component 120 can receive input indicating a user's desire to utilize an image. For example, a user can provide input, via an interface, that represents a user's selection of a desired 2D image. In another example, a user can provide input indicating the user's desire to move or reposition a best-fit 2D image for viewing. Repositioning an image can comprise selecting a new viewpoint and replacing a current viewpoint associated with the image with the new viewpoint. One example of a user-selected location is a point of a displayed 3D model selected by the user indicating a desired user position for viewing a 2D image. In this and in other embodiments described herein, a ray may be cast out from a current viewpoint into a 3D model to find the location on the 3D model. The nearest 2D data capture point from that location can be selected. In another embodiment, the nearest 2D data capture point in the same room or the nearest 2D capture point that can be navigated to without passing through or around a wall or other object of a model can be selected.

In another example, a user-selected location can be a position of a 3D model selected by the user indicating a desired position of the model for viewing as a 2D image. A fixed area surrounding the selected position of the 3D model, or one that is dependent on the current distance from the user position to the position, may be used to define a desired area of the 3D model to be viewed.

In some embodiments, a user-selected location can be a region, such as a rectangle or area, of a current field of view of the 3D model. Points on the 3D model at corners of this region may be used to define a desired volume of the 3D model to be viewed as a 2D image. In various embodiments, a 3D object in a 3D model can be selected (e.g., based on user input). The selected object's position and size may be used to define a desired area of the 3D model to be viewed as a 2D image and an appropriate 2D image can be selected for display.

In an aspect, an average or median position of the nearest points in the 3D model seen within a region (or a statistical sample thereof) or portions of a selected object visible to the user (or a statistical sample thereof) can be used to define the center of a desired volume to be viewed. A standard deviation of these points' positions can be used to define a desired size or field of view. A collection of nearest points can be used in the selection of a desired view. It is noted that an entire current field of view of a 3D model can be characterized in the same manner as a selected region; thus, the same characteristics can be computed on the entire field of view even when the user is not selecting a desired location or region.

The above embodiments describe various ways that selection component 120 can represent a desired area of a model to be viewed in 3D. These ways include, but are not limited to, a desired central position and a desired field of view, a desired central position and a desired size, and a section of the model (whether represented by points, triangles, voxels, a depth map at a specific viewpoint, or another type of spatial data) that is desired to be visible.

In various embodiments, selection component 120 can select a 2D image (e.g., a 2D panorama), associated orientation, or cropped field of view for display based on one or more factors. The selection of the correct 2D image and the like can be determined based on analysis of one or more factors, including, but not limited to the following:

Minimizing the direct spatial distance between the current user position in the 3D model or a user-indicated desired user position in the 3D model to the capture point of the 2D image;

Minimizing the user-navigable spatial distance (e.g., in walking mode) between a current user position in the 3D model or a user-indicated desired user position in the 3D model to a capture point associated with 2D image;

Minimizing a change in orientation between a current user orientation and a viewpoint orientation of a 2D image;

Maximizing a portion of a desired section of a 3D model that is visible in a 2D image or a cropped part of a 2D image;

Maximizing a portion of a 2D image or cropped part of a 2D image that is composed of parts from a desired section of the 3D model;

Minimizing a distance between a desired central position within a 3D model and a central position of a part of the 3D model viewed by a 2D image;

Minimizing a difference between a desired field of view within a 3D model and a field of view of a 2D image or cropped part of a 2D image;

Minimizing a difference between a desired size of a user-selected area of a 3D model and the standard deviation of a volume seen by a 2D image or cropped part of a 2D image;

Maximizing a level of visual detail discernible on pixels in a 2D image or cropped part of a 2D image, it is noted that this can be limited to only pixels that correspond to points inside a desired volume or desired section of a 3D model;

Whether a user position in a 3D model and a capture point of a 2D image are in the same room of the 3D model; or Minimizing the median on-screen pixel distance between pixels of a 3D model as seen in a 2D image or cropped part of the 2D image and the same locations on the 3D model in the user's current or desired view of the 3D model.

Selection component 120 can combine one or more of the above factors using various weightings to produce a score associated with 2D images. In another aspect, a 2D image (or set of images) that has a best score or score above a determined threshold can be selected for display. The score can be computed for all possible 2D images (as well as optionally a range of possible center points, orientations, and/or fields of view), or various heuristics may be used to reduce the search space of possible solutions.

Images associated with a score above a threshold score can be selected as candidate images. In an aspect, the score can be a weighted score based on selection criteria such as the above described factors. Candidate images can be further compared (e.g., based on a more stringent matching process, user input, and the like) to determine a best possible image for display. Once an appropriate candidate image is selected, the image can be displayed or marked for later use. In additional or alternative embodiments, a 2D image with the highest score for a given viewpoint of the 3D model or given user-selected desired criteria can be directly selected by selection component 120.

In one exemplary implementation, selection component 120 can automatically and dynamically assign a rank or score to portions of 2D imagery data or 3D imagery data with use of probability models, inference models, artificial intelligence models, and the like. For example, selection component 120 can utilize a dynamic Bayesian network such as a Hidden Markov Model (HMM) using a Viterbi algorithm. For example, a HMI can be configured for a feature (e.g., distinguishable portion of an image) emphasis, scene/composition emphasis, image quality emphasis (e.g., resolution, sharpness, contrast, color saturation, noise), emphasis based on one or more selection criterions described herein, or distance emphasis (e.g., navigational or actual distance) such that comparison, scoring according to a metric, or positioning occur simultaneously or substantially simultaneously.

In another example, selection component 120 can use a variety of suitable artificial intelligence (AI)-based schemes as described supra in connection with facilitating various aspects of the herein described invention. For example, a process for learning explicitly or implicitly how to select 2D imagery data for a given viewpoint, region, or area of a 3D model can be facilitated via an automatic classification system and process. Inferring or learning can employ a probabilistic or statistical-based analysis to infer an action that is to be executed. For example, a support vector machine (SVM) classifier can be employed. Other learning approaches include Bayesian networks, decision trees, and probabilistic classification models providing different patterns of independence can be employed. Learning as used herein also is inclusive of statistical regression that is utilized to develop models of priority.

As will be readily appreciated from the subject specification, the subject innovation can employ learning classifiers that are explicitly trained (e.g., via a generic training data) as well as implicitly trained (e.g., via observing user behavior, receiving extrinsic information) so that the learning classifier is used to automatically determine according to a predetermined criteria which action to take. For example, SVM's can be configured via a learning or training phase within a learning classifier constructor and feature selection module. A learning classifier is a function that maps an input attribute vector, k=(k1, k2, k3, k4, kn), to a confidence that the input belongs to a learning class—that is, f(k)=confidence(class).

In some embodiments, selection component 120 can generate a set of 2D images associated with positions associated with 3D imagery data at a time of construction, at a time of capture, or otherwise prior to user navigation of a 3D model, automatic navigation of a 3D model, or rendering of a 3D model. For example, selection component 120 can generate a set of 2D images (and/or associated viewpoints) that have been selected and associated with positions of a 3D model at a time when construction of a model is occurring, at a time after construction of a model, or at various other times. The generated set of 2D images can be associated with positions of a 3D model and can be utilized during user navigation or rendering. In an aspect, selection component 120 can determine a set of positions and orientations to select 2D images or utilize positions and orientations determined during construction of a 3D model. Determining the set of positions and orientations can comprise selecting positions and orientations based on a regularly spaced grid, distances between positions and orientations, user input, a quality metric of 3D imagery data (e.g., holes, etc.), capture positions, and the like and a given user position or orientation can be match to a nearest-neighbor. In another aspect, selection component 120 can select 2D images based on a quality metric of the 2D images. For example, selection component 120 can select a number of best quality images, according to a quality metric, and can associate the images with positions and orientations of 3D imagery data. In another example, selection component 120 can select a number of images per room, volumetric space, and the like. In some aspects, a pre-generated set can reduce a burden on a processor during rendering or navigation of a 3D model.

In other embodiments, some or all of the 2D images are selected and matched at or during a time of user navigation and rendering of a 3D model, or based on a triggering event. For example, selection component 120 can generate a 2D image or set of 2D images (and/or associated viewpoints) as candidates for potential display at a time when rendering of a model is occurring, at a time when a user is navigating a model, based on a user navigating to a position of a 3D model, based on a user viewing a field of view (e.g., a user views a particular field of view for a determined amount of time), according to user input, or the like. In another example, one or more 2D images can be selected based on a navigational position, based on a field of view, based on user input (e.g., user selecting an option to show all 2D images and/or viewpoints), based on focusing on a volumetric space of a model, or the like. In an aspect, a pre-selected 2D image or set of 2D images (or associated viewpoints) utilized for transitions based on positions of a 3D model can avoid unnecessary processing during rendering or navigation. For example, if a user never navigates to a portion of a 3D model, the selection component 120 can forgo selection of 2D images for that portion of the 3D model.

In another aspect, selection component 120 can determine whether and what 2D images should be selected and matched prior to rendering or navigation. Determining whether and what 2D images to select prior to rendering or navigation can be based on a history of use (e.g., by the user or a set of users). In embodiments, selection component 120 can learn or identify patterns of use such as navigation patterns of users and the like. Selection component 120 can utilize identifiable patterns to determine a likelihood of whether a position or area within the 3D model will be associated with a request to alternate between modes, a user navigation, or the like. In another aspect, the identifiable patterns can indicate a time period associated with the likelihood. For example, a user may be more likely to view a particular area of a 3D model during a time period beginning just after rendering a 3D model and lasting a determined amount of time. Accordingly, selection component 120 can download and/or select 2D images associated with the area, prior to rendering, such that an initial processing demand is reduced.

In another aspect, system 100 can perform (e.g., via one or more components) various transforms, alterations, or adjustments to imagery data. For example, a 2D image can be captured in different lighting or with a different camera compared to capturing of a 3D image. System 100 can alter the images to compensate for differences in capturing, such as through adjusting of image fields (e.g., hue, intensity, etc,), cropping images, noise reduction, and the like. It is noted that altered images can then be compared to improve or alter potential scores. In some embodiments, system 100 can stitch 2D images to form panoramic images and can normalize each image that forms the panoramic image.

In various embodiments, selection component 120 can select viewpoints of a model to match with viewpoints or locations of a disparate model or image. For example, a 3D model can comprise position data (e.g., positions in a 3D space) and a 2D image can be associated with a set of 2D viewpoints (e.g., points of capture, available points that 2D images can be viewed from, etc.). Selection component 120 can associate each or a subset of the 2D viewpoints with a set of positions in the 3D model. Additionally or alternately, selection component may choose a particular 2D viewpoint for a given 3D viewpoint. The association can be based on positional data (e.g., distance), content matching, and the like. A distance can represent an absolute distance (e.g., based on coordinates) or a navigational distance (e.g., a distance based on what a user walking on the surface of the model would have to traverse in order to not pass through objects, walls, etc.). For example, a 3D viewpoint can be located on an eastern side of a wall and a 2D viewpoint can be on a western side of the wall. The distance between the 3D viewpoint and the 2D viewpoint can be the navigational distance measured from the 3D viewpoint, around the wall (without passing through the wall), and to the 2D viewpoint. The selection component 120 may choose an associated 2D image for a given 3D viewpoint by minimizing a metric of distance, or may use this metric of distance as part of a computed score for selecting associations.

In another aspect, construction component 110 can receive 2D image selection data from selection component 120. The image selection data can be applied or attached to a model. For example, given a 3D model, construction component 110 can apply selected 2D imagery data to the 3D model. This can include overlaying 2D images on the 3D model, adding 2D viewpoints (or representations thereof) to the 3D model, generating transitions between the 3D model and 2D images, and the like, as is described in more detail below.

In embodiments, construction component 110 can render a 3D model and can facilitate displaying a field of view of the 3D model. In some embodiments, if a 2D image is available and associated with the a portion of the 3D model, construction component 110 can render the 2D image, provide a notification of the availability of the 2D image, or transition from the 3D model to a 2D image. In other embodiments, an appropriate 2D image can be selected based on a field of view, a distance to a viewpoint (e.g., actual or navigational distance), user input (e.g., user selecting a particular area or volumetric space), a learning process, and the like. The selected 2D image or a representation of the 2D image can then be displayed or can be displayed based on a triggering event.

In an aspect, the 2D image can be a panoramic image of the living space and switching from the 3D model to the 2D image can include switching to a selected viewpoint and at a determined degree of rotation about an axis of the viewpoint. For example, a user can be viewing north in a 3D model and can decide to switch to a 2D panoramic image. Construction component 110 can render the 2D panoramic image such that the user will be viewing north. It is noted that proper alignment and orientation of 2D imagery data can allow for appropriate transitions.

Figure 2:
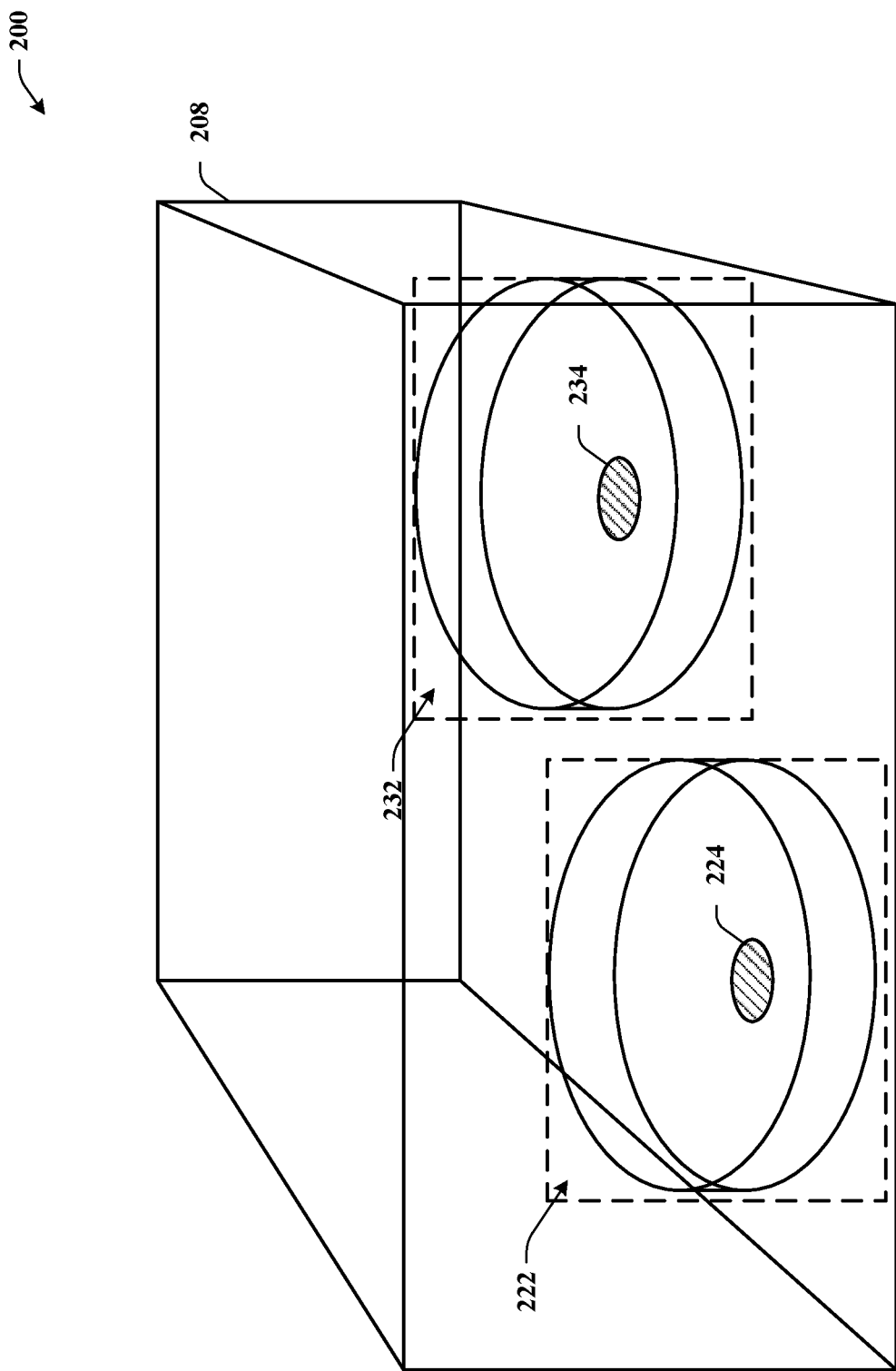
FIG. 2 illustrates a graphical depiction of 2D panoramic images within a 3D model in accordance with certain embodiments of this disclosure.

Referring now to FIG. 2 with reference to FIG. 1, there is illustrated is a graphical depiction of system 200 that can select a 2D image within a 3D model. As depicted, system 200 can comprise a 3D model 208 of a space (e.g., a room). Within the space, a set of 2D images can be available, such as panoramic image 222 and panoramic image 232. Panoramic image 222 can be associated with a capture position 224, representing a position of a camera or other capturing device utilized to capture images that are stitched together to form panoramic image 222. Likewise, panoramic image 232 can be associated with a capture position 234, representing a position of a camera or other capturing device utilized to capture images that are stitched together to form panoramic image 232.

In an aspect, construction component 110 can generate 3D model 208 in accordance with various embodiments disclosed herein. In some embodiments, construction component 110 can also generate panoramic image 222 and panoramic image 232. Selection component 120 can select panoramic image 222 or panoramic image 232 based on selection criteria as described in various embodiments herein. For example, during navigation of 3D model 208, selection component can determine a current position associated with a current field of view and can select panoramic image 222 or panoramic image 232 based on the current position. A rendering can switch between rendering the 3D model 208 and a selected panoramic image (e.g., panoramic image 222 or panoramic image 232).

In other embodiments, selection component 120 can generate a first set of positions relative to a 3D model and select a 2D image to associate with the first set of positions. For example, selection component 120 can use a metric of distance to determine the 2D image (222, 232) associated with each region of 3D model 208. The minimum distance between a given location in the 3D model and the capture position (224, 234) of any 2D image (222, 232) may be used as a metric. 2D images can be associated with positions of a 3D model prior to rendering or navigation of 3D model 208.

In some embodiments, selection component 120 can utilized weighted scores to select panoramic image 222 or panoramic image 232. For example, selection component 120 can select an image based on a weighted score representing a score determined based on a distance to a capture position, a quality metric, a user defined preference, or any other desired criteria.

Figure 3:
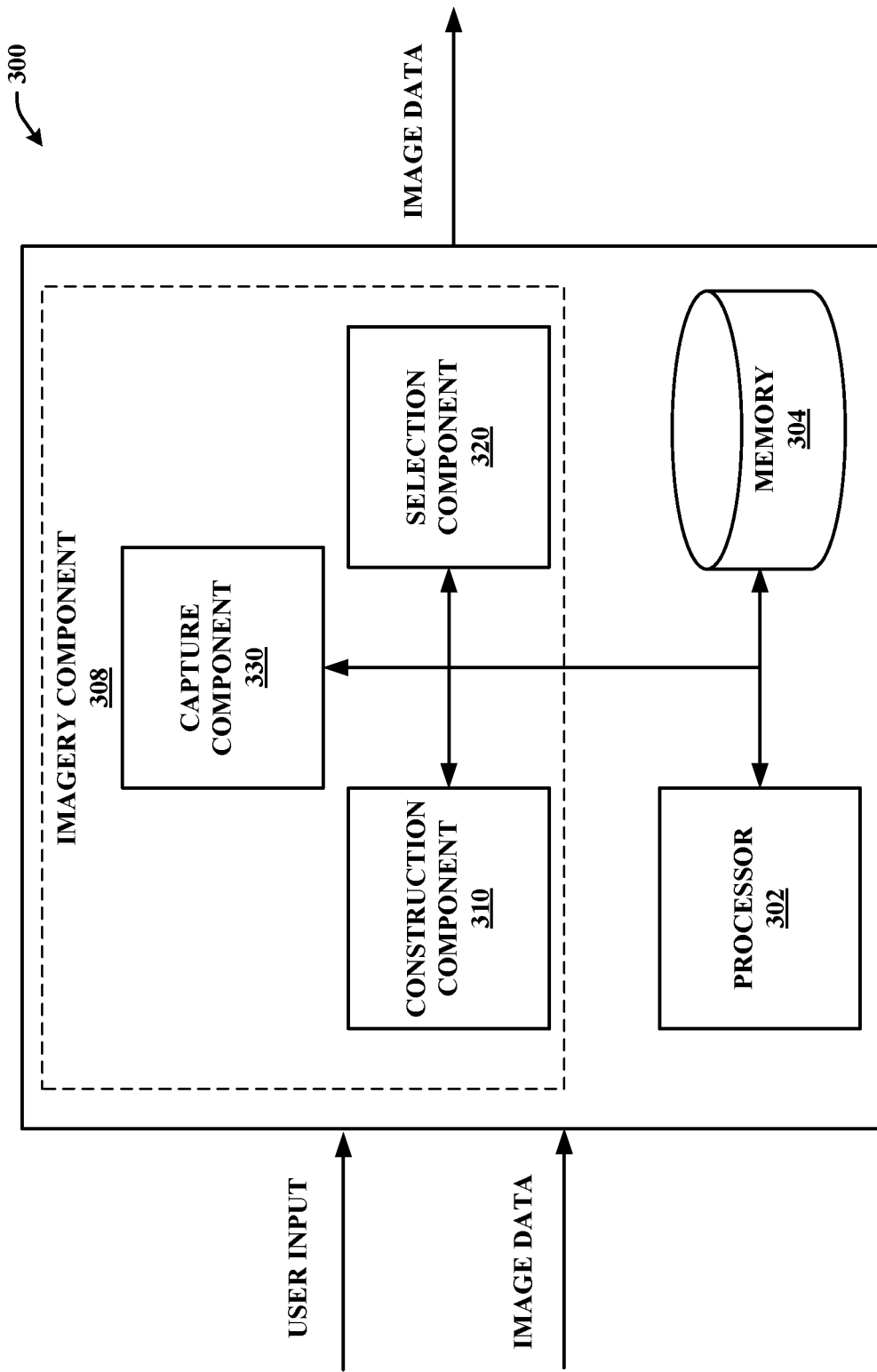
FIG. 3 illustrates a high-level block diagram of an example system that can capture media content and generate models in accordance with certain embodiments of this disclosure.

Turning now to FIG. 3, a system 300 is depicted. System 300 can capture media content and generate correlated models, in accordance with various embodiments disclosed here. System 300 can include a memory 304 that stores computer executable components and a processor 302 that executes computer executable components stored in the memory 304. It is to be appreciated that the system 300 can include various components described with reference to other systems or can be used in connection with implementing one or more of the systems or components shown and described in connection with other figures disclosed herein. It is further noted that all or part of system 300 can be included within larger systems, such as cameras, tablet computers, smart phones, laptop computers, desktop computers, personal digital assistants (PDA's) and the like.

As depicted, system 300 can include communicably coupled components including an imagery component 308 (which can generate 3D models based on captured media and can select 3D data appropriate for given 2D imagery data). Imagery component 308 can primarily comprise construction component 310 (which can generate 3D models and 2D models), selection component 320 (which can select 2D imagery data associated with a given viewpoint of the 3D model), and capture component 330 (which can facilitate capturing media content or sensory data). It is noted that construction component 310 and selection component 320 can respectively function similarly to construction component 110 and selection component 120.

Capture component 330 can receive data from one or more image capturing devices or can comprise one or more image capturing devices. Capturing devices can comprise 2D camera devices, 3D camera systems, sensors, and the like. For example, capturing devices can comprise hardware such as light detection and ranging (LIDAR) sensors, capture devices that not only capture color but that are also inexpensive, such as the PrimeSense™ Ltd. hardware in Microsoft Corporation's Kinect™, hand-held laser line scanners, structured light projectors paired with cameras such as the Microsoft® Kinect, other structured light systems, stereo cameras with software for depth derivation, stereo cameras paired with pattern projection systems as well as software for depth derivation, time-of-flight cameras, video cameras capable of structure-from-motion calculations, and lightfield cameras. It is further noted that multiple capture devices may be combined or a capture device may be paired with a color camera to provide color detail for the captured information.

Figure 4:
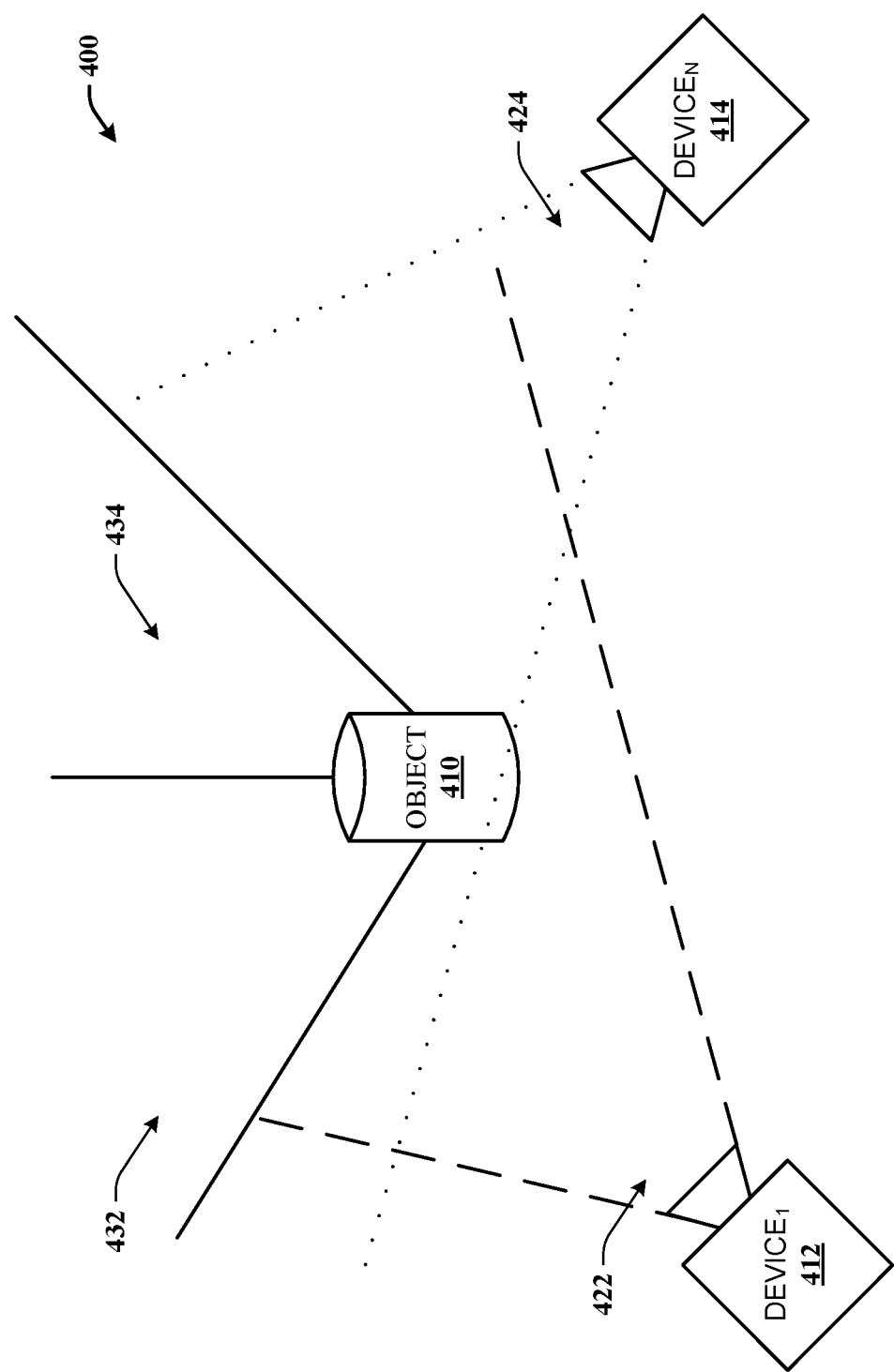
FIG. 4 illustrates a high-level block diagram of an example system that can capture content in accordance with embodiments of this disclosure.

Turning to FIG. 4, with reference to FIG. 3, there illustrated is an exemplary capturing system 400 in an environment to be captured. System 400 can comprise one or more capturing devices, such as $device_1$ 412 to $device_N$ 414, where N is a number representing a number of cameras. While depicted as separate devices, it is noted that $device_1$ 412 and $device_N$ 414 can represent a single devices in one or more positions over time. In an aspect, $device_1$ 412 and $device_N$ 414 can communicate (e.g., wirelessly, or wired) via a network or can each capture data to be aggregated at a later time.

In another aspect, $device_1$ 412 to $device_N$ 414 can comprise all or a portion of system 300. As depicted, $device_1$ 412 can capture images or sensor data from a field of capture 422 and $device_N$ 414 can capture images or sensor data from a field of capture 424. It is noted that $device_1$ 412 and $device_N$ 414 can be rotated about an axis to capture content of a real-world space.

In embodiments, $device_1$ 412 and $device_N$ 414 can be rotated or repositioned via a motor that rotates or repositions $device_1$ 412 and $device_N$ 414 such that field of capture 422 and field of capture 424 are rotated or repositioned. In some embodiments, the rotation or repositioning can be accomplished based on a user control, such as input received from input devices (e.g., joystick, buttons, remotes, mouse, etc.) or based on physical movement (e.g., user repositions or manually rotates). In an aspect, a set of 2D images or a 2D panoramic image can correspond to $device_1$ 412 and another set of 2D images or a panoramic image can correspond to $device_N$ 414.

In operation, $device_1$ 412 and $device_N$ 414 can capture data corresponding to one or more views of surface 432 (e.g., a wall), surface 434 (e.g., a different wall), or objects within an environment, such as object 410. It is noted that object 410 can represent any detectable object, such as furniture, living objects (e.g., plants, people, animals, etc.), or virtually any object. In some embodiments, captured content can be utilized for generation of one or more panoramic images (e.g., via construction component 310).

Turning back to FIG. 3, with reference to FIG. 4, content captured by capture component 330 can be received as captured content (e.g., images, videos, sensor data, etc.). In an aspect, capture component 330 can received sets of captured content. The sets of captured content can correspond to sets based on a particular capturing device (e.g., $device_1$ 412 and $device_N$ 414), axis point, viewpoint, and the like. In embodiments, construction component 310 can render models based on the captured content, stored content, computer generated content, and the like. It is noted, that construction component 310 can utilize a combination of different sets of captured content to generate one or more 3D models or 2D models. In an aspect, construction component 310 can correlate the 2D images or 2D viewpoints and the 3D model in a common coordinate system. In another aspect, selection component 320 can select 2D images or 2D viewpoints based on a given position in the 3D model.

In embodiments, construction component 310 can generate or render models in one or more modes. It is noted that different modes can correspond to separate models or a single model with varying sets of viewpoints, navigational controls, rendering criteria, and the like. For example, a mode can correspond to availability of controls comprising alternating between a set of viewpoints, rotation about one or more axes (e.g., navigation or motion controls), panning in one or more directions, zooming in or out, or otherwise controlling a field of view. In another aspect, rendering criteria can comprise utilizing backface culling techniques, floor/ceiling/object removal, and the like. In embodiments, modes can comprise one or more of a 3D mode or a 2D mode, a 3D or 2D mode of each of a walking mode, a floor plan mode, an orbital mode, or other desired mode. It is noted that references to 2D walking modes, floor plan modes, or orbital modes can comprise 2D representations of 3D modes with appropriate modifications or constraints. In some embodiments, a 2D orbital mode may not be available depending on constraints that define an orbital mode.

A 3D walking mode can refer to a mode that generates viewpoints within a 3D model. For example, viewpoints can be based on a camera position, a point within a 3D model, a camera orientation, and the like. In an aspect, navigation within a 3D model can simulate a user walking through or otherwise traveling through a real-world scene. The user can rotate and move freely to view the scene from different angles, vantage points, heights, or perspectives. The user may be constrained to have a camera viewpoint at a particular height above the model surface except when crouching or in the air (e.g., jumping, falling off an edge etc). In an aspect, collision checking or a navigation mesh can be applied such that users are restricted from passing through objects.

In another aspect, a 2D walking mode can refer to a 2D representation of a 3D walking mode. For example, a 2D walking mode can comprise a set of panoramic images and associated viewpoints. A user can navigate between viewpoints and rotate about a given viewpoint. It is noted that a 2D model may be constrained so a user can rotate around a single axis.

An orbital mode can represent a mode wherein a user perceives the model such that the user is outside or above the model and can freely rotate a model about a central point as well as move the central point around the model. Multiple types of motion may be possible in orbital mode. For example, a viewpoint may be pitched up or down, rotated left or right around a vertical axis, zoomed in or out, or moved horizontally. The pitch, rotation-around-a-vertical-axis, and zoom motions may be relative to a central point, such as defined by an (X, Y, Z) coordinate. A vertical axis of rotation may pass through the central point. In the case of pitch and rotation-around-a-vertical-axis, those motions may maintain a constant distance to the central point. Thus, the pitch and rotation around-a-vertical-axis motions of the viewpoint may be thought of as vertical and horizontal travel, respectively, on the surface of a sphere centered on the central point. Zoom may be thought of as travel along the ray defined as passing through the viewpoint to the central point.

The point on the 3D model with or without back-face culling or other ceiling removal techniques that is rendered in the center of the display may be used as the central point. Alternately, this central point may be defined by the point of a horizontal plane that is at the center of the display. This horizontal plane may be invisible, and its height may be defined by a global height of the floor of the 3D model. Alternately, a local floor height may be determined, and the intersection of the ray cast from the camera to the center of the display with the surface of the local floor height may be used to determine the central point.

The height of the floor of the 3D model may be determined via a variety of methods. For example, the points or faces of the model with normal vectors that are within a particular threshold angle of vertical pointing up may be assumed to be candidate floor locations. A global floor height could be calculated by determining the median of the heights of these candidate floor locations. Alternately, a local floor height could be computed by taking the average or median of floor heights over a specific area. In an embodiment of orbital mode, the projection mode for the 3D rendering is perspective mode. The orientation of the camera may disallow rolling such that the view of the model is never tilted to one side. Limitations on these and other possible modes, orientations, and positions may be imposed. For example, pitch may be clamped such that it is impossible to go past ninety degrees down at the steepest or some angle above zero degrees down at the shallowest. The zoom level may be clamped such that the closest zoom is a specified distance from the central point and the farthest zoom is such that the entire 3D model is visible.

In some embodiments, a 2D orbital mode can comprise a 2D representation of a 3D orbital mode. The 2D orbital mode can comprise navigation constraints consistent with 2D imagery data. For example, a 2D image of a floor plan, orthographic view, or perspective view, can be rendered (e.g., by construction component 310). Navigation controls can comprise zooming in/out, moving focus points of a display, altering an angle (pitch) of view, and the like. For example, a 2D image can be thought of as being a plane in a 3D space. The 2D image can be viewed from above (e.g., at a fixed angle near 90 degrees) or can be viewed from a disparate angle (e.g., less than 90 degrees). In an aspect, a user can determine an angle of view. A large number of 2D images representing points of view of the 3D model may be pre-rendered. Icons representing captured 2D imagery may be displayed on top of or near the rendered image of the 3D model. These icons may allow the user to load and view captured 2D images or panoramas.

A floor plan mode can represent a mode wherein the user perceives the model such that the user is outside or above the model. For example, a user can view all or a portion of a model from an aerial vantage point. The model can be moved or rotated about an axis. As an example, floor plan mode can correspond to a top down view, wherein the model is rendered such that a user looks directly down onto a model or at a fixed angle down onto the model (e.g., approximately ninety degrees above a floor or bottom plane of a model). The set of motion or navigation controls and mappings in floor plan mode may be a subset of those for orbital mode or total available controls of other models. For example, the controls for floor plan mode may be identical to those described in the context of orbital mode with the exception that the pitch at a fix number of degrees downward. Rotation about a central point along a vertical axis is still possible as is zooming in and out toward and away from that point and moving the central point. The model may, however, only be viewed directly from above as a result of the fixing a pitch.

In embodiments, 2D modes can include the various modes described above. However, in a 2D mode, rendered content (e.g., by construction component 310) can be limited to available 2D imagery data. It is noted that a set of geometric shapes can be generated and 2D imagery can be wrapped around the geometric shapes such that walls or other objects can be displayed in 2D models. It is further noted that a 2D model can comprise a limited set of controls, viewpoints, and the like. For example, a 2D model can comprise a fixed number of viewpoints (e.g., corresponding to a position of capture of 2D images).

Figure 5:
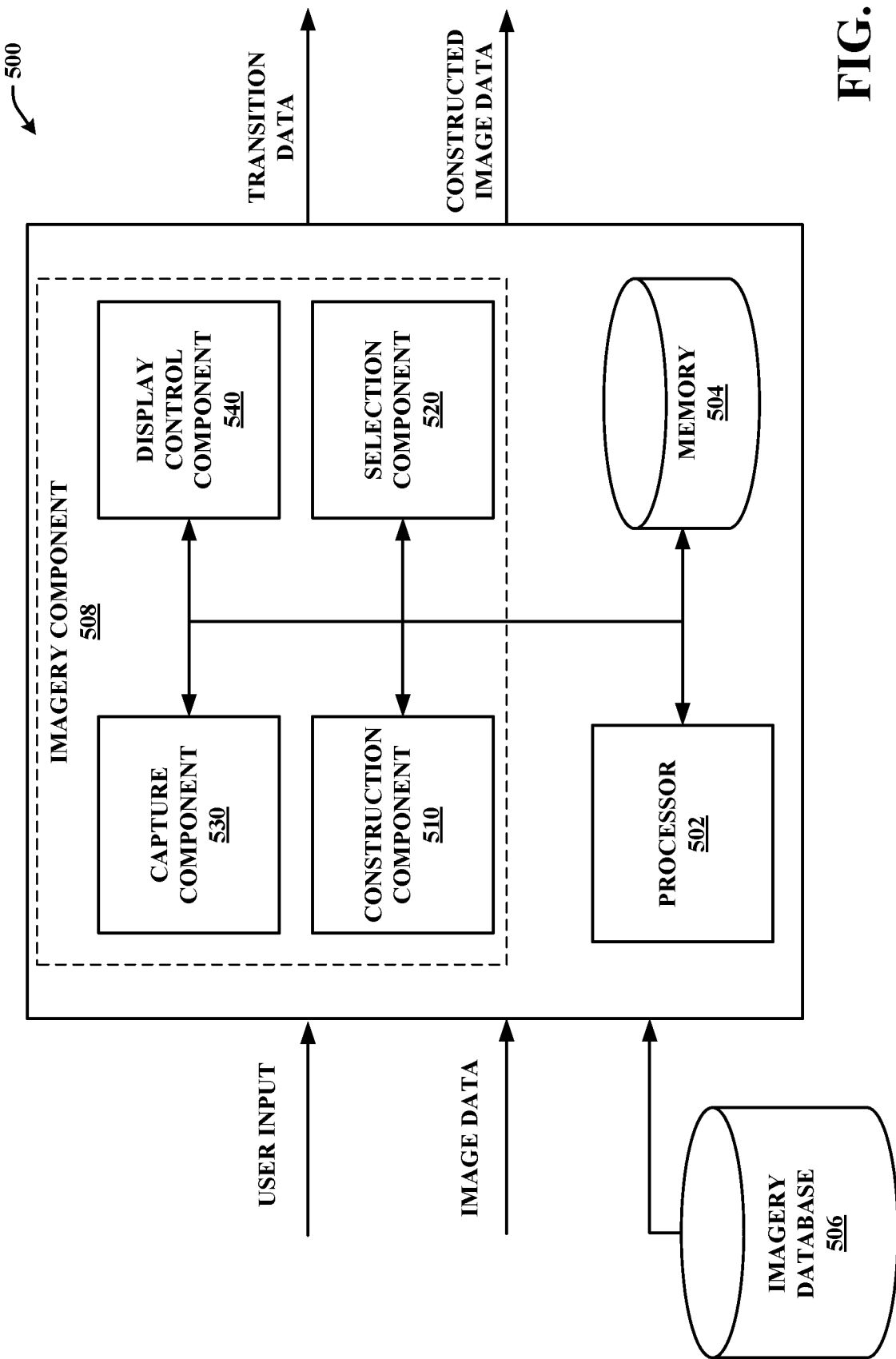
FIG. 5 illustrates a high-level block diagram of an example system that can facilitate navigation of models in accordance with certain embodiments of this disclosure.

Turning now to FIG. 5, a system 500 is depicted. System 500 can facilitate navigation of 3D models, in accordance with various embodiments disclosed here. System 500 can include a memory 504 that stores computer executable components and a processor 502 that executes computer executable components stored in the memory 504. System 500 can also include an imagery database 506 (which stores reference media items and associated data). While system 500 is described as including imagery database 506, it is noted that system 500 can include other databases, or additional databases.

As depicted, system 500 can include communicably coupled components including an imagery component 508 (which can generate 3D models based on captured media and can allow navigation of these models via a mix of 3D and 2D modes). Imagery component 508 can primarily comprise construction component 510 (which can generate 3D models and 2D models), selection component 520 (which can select 2D imagery data based on 3D imagery data or navigation data), capture component 530 (which can facilitate capturing media content or sensory data), and display control component 540 (which can facilitate navigation of models, transitioning of modes, and the like). It is noted that similarly named components of system 500 and other systems described herein can comprise similar aspects. It is to be appreciated that the system 500 can include various components described with reference to other systems described herein (e.g., system 100, system 300, etc.).

Imagery database 506 can comprise imagery data (2D or 3D), models, partial models, correlated 2D and 3D imagery, and the like. In an aspect, construction component 510 can receive a model or portion of a model from imagery database 506 and can render the model. In another aspect, capture component 530 can capture content and store the content (as raw data or processed data) in imagery database 506. In embodiments, imagery database 506 can comprise a local storage device or a remote storage device. For example, a model can be generated or downloaded to a local storage of a device. In another example, a model or portions of a model can be streamed to imagery component 508.

In an aspect, display control component 540 can facilitate movement within a 3D model, including providing navigation controls, updating fields of view, generating transitions, generating notifications, and the like. For example, display control component 540, as described in more detail with reference to FIG. 6, can provide navigation controls based on a 3D model rendered in a particular mode.

A notification can comprise a signal that a particular control or feature is available or not available. It is noted that a notification can comprise an audible cue, visual cue, motion cue (e.g., vibration), a combination of cues, or the like. Audible cues can comprise an audible signal output by a device (e.g., speaker), such as a chirp, ring tone, and the like. It is further noted that a set of audible cues can be provided and a user can selectively determine what each audible cue signifies (e.g., such as via a user settings interface). Visual cues can take many forms. Visual cues can comprise activation of a light (e.g., light emitting diode (LED) of a device), generating a visual cue on an interface device such as a display screen, and the like. For example, a visual cue can comprise a pop-up or fly-out notification, a token (e.g., 2D symbol, 3D symbol, text data, and the like), modification of an image (e.g., highlighting a portion of a model, flashing a portion of a model, etc.), activation/deactivation of a control (e.g., altering a visual characteristic of a button, allowing a button to be selectable, etc.), and the like. A visual cue may be at a fixed point on the display. In some embodiments, the visual cue may be displayed as an overlay or a 2D or 3D object in the 3D model. The position of this visual cue relative to the 3D model may correspond to the correlated position of the part of the 3D model seen in the 2D image (e.g., an outline of this region or an icon in the center), the correlated position of the point at which the image was captured, or the correlated center point from which a panoramic 2D image was captured. This point may also be displayed at the surface of the model below the center point or capture point. Multiple visual cues from different 2D images may be displayed at the same time. A particular selection threshold may be used to decide which 2D images' visual cues to display, with only 2D images for which a score meets a certain threshold for selection relative to the current viewpoint of the 3D model being displayed.

In embodiments, display control component 540 can be in communication with or comprise various input devices. Input devices can, for example, include user interface devices such as a mouse, a keyboard, a touch screen, a remote, a motion sensor, a microphone, camera, a gesture sensor, or other sensory device. As an example, a user can select a control to alternate between viewpoints, zoom in/out of an image, alternate between modes, display 2D content, access menus, and the like. In embodiments, a user can swipe, click, gesture, provide speech controls, activate a motion sensor (e.g., shake or rotate a device, etc.), and the like.

In an aspect, selection component 520 can receive a navigation position from display control component 540. The navigation position can comprise data identifying a position or an orientation corresponding to a rendered field of view for a current navigation position within a model, a focal point of a field of view, or the like. For example, with reference to FIG. 2, display control component 540 can facilitate navigation of 3D model 208. Selection component 520 can receive a navigation position from display control component 540. Based on the navigation position, selection component 520 can select panoramic image 222 or panoramic image 232. It is noted that a selection component 520 can select other images or portions of panoramic image 222 or panoramic image 232. For example, a user can provide input indicating a user desires to see a single 2D image in a non-panoramic mode in a 2D image viewing portal (e.g., a pop up window).

Figure 6:
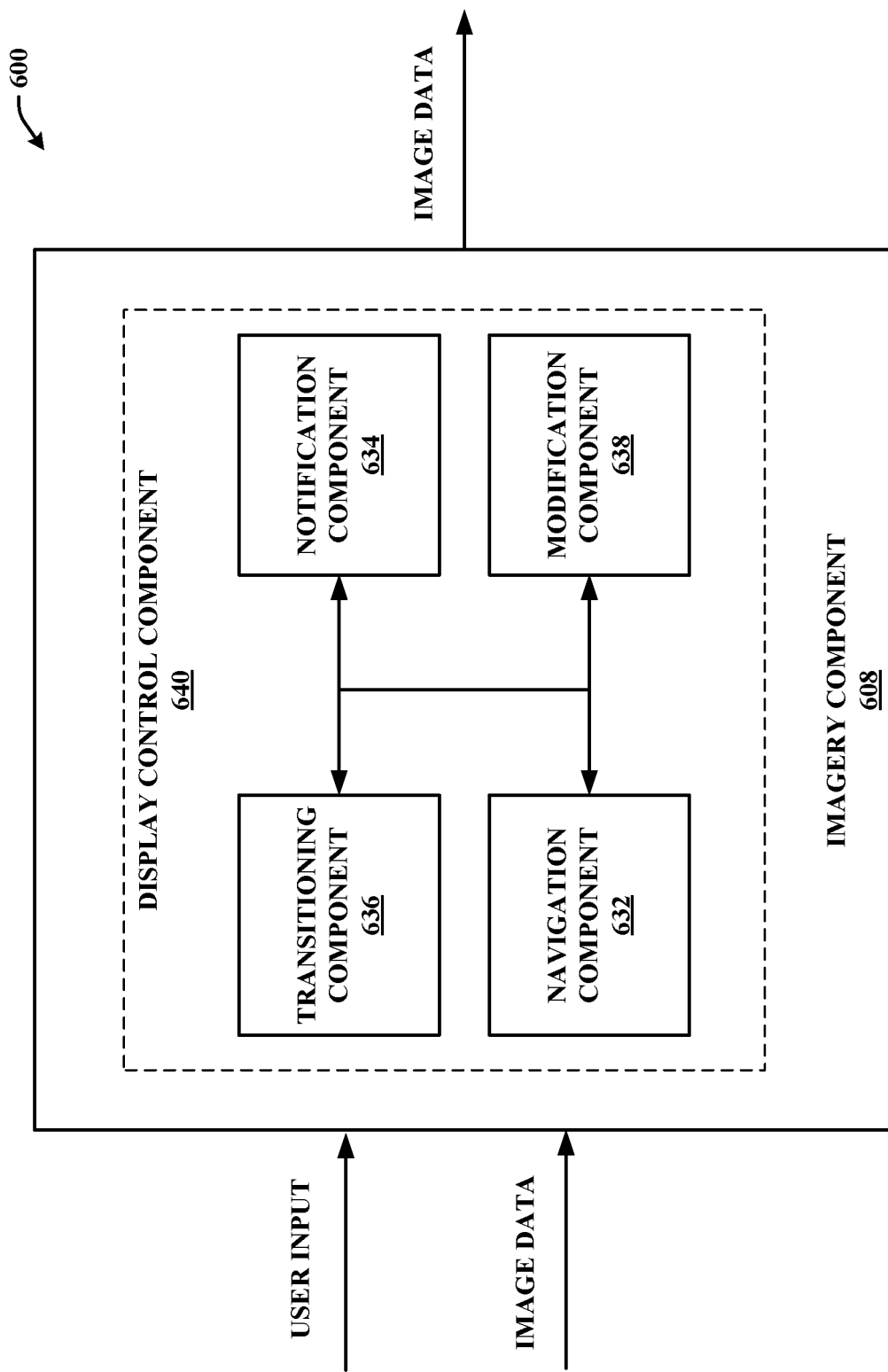
FIG. 6 illustrates a high-level block diagram of an example system that can facilitate navigation, manipulation, and control of a model in accordance with certain embodiments of this disclosure.

Turning now to FIG. 6, a system 600 is depicted. System 600 can facilitate navigation, manipulation, and control of a model, in accordance with various embodiments disclosed here. In an aspect, system 600 describes a display control component in greater detail. While not shown, system 600 can include a memory that stores computer executable components and a processor that executes computer executable components stored in the memory. As depicted, system 600 can include communicably coupled components including an imagery component 608 (which can generate 3D models based on captured media and can allow navigation of these models via a combination of 3D and 2D modes). Imagery component 608 can comprise a display control component 640 (which can facilitate navigation of models, transitioning of models, and the like). Display control component 640 can primarily comprise navigation component 632 (which can facilitate navigation of models), notification component 634 (which can generate notifications), transitioning component 636 (which can transition between modes or 2D/3D imagery), and modification component 638 (which can provide tools for modifying/altering aspects of models or images). It is to be appreciated that the system 600 can include or be in communication with various components described with reference to other systems described herein (e.g., system 100, system 300, system 400, system 500 etc.).

Navigation component 632 can facilitate navigation of a model. In embodiments, navigation component 632 can provide various forms of navigation based on a rendered model or available imagery data. For example, in a walking mode, navigation component 632 can provide a set of viewpoints representing points where users can move a field of view (e.g., along an axis of an X, Y, Z Euclidian space, along axes relative to the current orientation, or along the surface of the model at a particular height), zoom in/out, select an area within a field of view, reposition or reorient a model or imagery data, and the like.

In a walking mode, navigation component 632 can apply a set of available navigation controls. Navigation controls can comprise moving along an axis (e.g., along an axis of an X, Y, Z Euclidian space), moving along axes relative to the current orientation, moving along the surface of the model at a particular height, altering pitch or orientation, and the like. In use, a user can utilize controls to alter a field of view, as a user could if the user was walking in a real-world space. This can including moving left, right, straight, back, up (e.g., step ladder control), down (e.g., crouching), zooming in/out, and the like. It is noted that backface culling can be applied when generating fields of view. In another aspect, navigation component 636 can apply limitations to movements, such as limitations to prevent passing through objects, allowing passing through of certain objects, limitations to movement along a particular axis, and the like. It is noted, that limitations and available controls can be altered based on desired settings, a defined condition (e.g., subscription to a service), a current mode, and the like.

Figure 7:
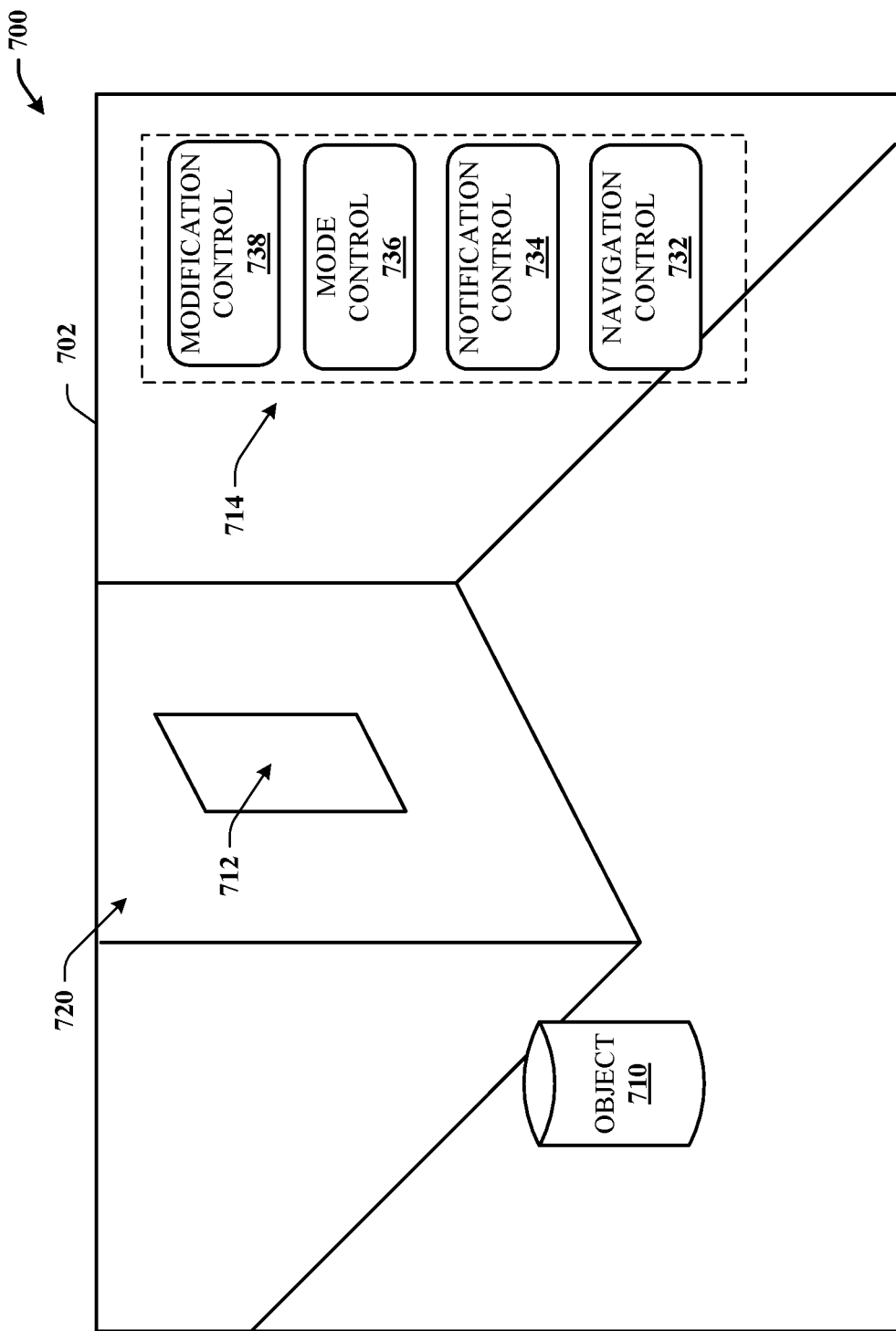
FIG. 7 illustrates a high-level block diagram of an example system that can facilitate display of a model in accordance with certain embodiments of this disclosure.

Referring now to FIG. 7, with reference to FIG. 6, there illustrated is an example system 700. System 700 can comprise a display 702 that can render a model and control components. In an aspect, display 702 can comprise a rendering of a portion of a 3D model comprising object 710, wall 720, wall section 712 for which there is correlated 2D imagery, and a control portal 714. Control portal 714 can comprise one or more available controls such as a navigation control 732, a notification control 734, a mode control 736, and a modification control 738. It is noted that display 702 can provide additional controls. Navigation component 632 can navigate within a model such that display 702 alters a field of view. For example, a field of view can rotate such that a user can see different parts of a living space. In another example, a user can move closer to object 710.

In another example, navigation component 632 can apply limitations such that object 710 cannot be passed through. For example, if a user attempts to "walk" through object 710 then navigation component 632 can prevent the user from passing through object 710 or can trigger a notification that the user is attempting to pass through an image. It is noted that in some embodiments, navigation component 632 can allow the user free movement through objects, walls, and the like. In another aspect, a particular object or portion of an object can be configured to allow a user to pass through. For example, navigation component 632 can determine that an object or portion of a model correspond to a real-world door. Identifying the door can comprise image recognition of the door, metadata attached to the image, or user input.

In another aspect, navigation component 632 can provide a set of controls for an orbital mode or a floor plan mode. The controls can be appropriately provided based on constraints of the modes. In an aspect, navigation controls can be the same for both orbital mode and floor plan mode except for a limitation that the user cannot change a pitch of a field of view in the floor plan mode. Navigation component 632 may also provide for limited navigation of 2D images. For example, rotation, panning, and zooming on a 2D image may be possible. If the 2D image is panoramic, the user may change their viewpoint's orientation, allowing them to see different parts of the panorama. While viewing 2D images, users may be able to transition to viewing other 2D images at different viewpoints or to various viewing modes for the 3D model. Users may have a set of navigation controls 732 allowing these actions to take place.

In embodiments, navigation component 632 can facilitate manual navigation (e.g., based on user input), automatic navigation, or semi-automatic navigation. In manual navigation, a field of view does not change unless a user provides input. In automatic navigation, a field of view can change based on a predefined pattern, a dynamically defined pattern, and the like. In semi-automatic navigation, a field of view can change automatically or according to user input. For example, in a semi-automatic mode, navigation can be automatic unless a user provides input to interrupt, manipulate, or alter an automatic navigation. In another example, navigating to particular portions of a model or navigating to the portion for an amount of time can trigger an automatic navigation of the portion. For example, if a user navigates to a room of a 3D model, an automatic navigation of the room can be triggered. In another example, if the user does not provide input for a determined amount of time, then the navigation can switch to an automatic mode.

In another aspect, navigation component 632 can generate a video clip or slide show of a navigation of a model. For example, different viewpoints can be captured during navigation and the captured viewpoints can be aggregated into a video clip, slideshow, or other media content. In some embodiments, a user can provide input indicating the user desires that the navigation component 632 automatically generate media content based on navigation (manual, automatic, or semi-automatic). The media content can be generated based on an entire model or a portion of a model. For example, during manual navigation a user can provide input indicating the user would like a video of navigation of a particular room of a 3D model. Navigation component 632 can generate a video of manual user navigation or generate a video of an automatic navigation of the room.

Notification component 634 can generate notifications via one or more interfaces. As noted supra, a notification can comprise an audio, visual, textual, or motion notification. In embodiments, notification component 634 can generate notifications based on triggering events. A triggering event can comprise user input, navigation to a field of view or portion of a model, mousing over or hovering over an object, selecting an object (e.g., selecting a button, selecting an image, selecting a portion of a model, etc.), determining that a 2D image is available for view, and the like. As an example, a user can navigate to field of view 702. Notification component 634 can generate a notification indicating that 2D imagery data associated with wall section 712 can be viewed in the field of view. In an aspect, wall section 712 can correspond to a 2D image with a known position and orientation within the 3D model. The user can then select to view the 2D image and system 600 can render the 2D image (e.g., via transitioning component 636), as described below. In an aspect, notification component 634 can generate the notification in notification control 734. In another aspect, the notification can be outlining image 712, highlighting image 712, a generated indicator such as a notification token or faded 2D image (e.g., a graphical notification), a pop-up window, and the like. It is noted that a notification token can be placed at the floor (e.g., on a planar barrier) below a portion of a model that corresponds to an available 2D image, hovering a determined height above the floor, and the like.

In another example, an audible tone can be generated or a motion component can generate a vibration signal. The audible tone or vibration can indicate that a 2D image is available for view within the field of view.

In another aspect, notification component 634 can generate a notification based on a user viewing a field of view for a determined amount of time. For example, a user can view field of view 702 for a measured amount of time. If the measured amount of time exceeds a threshold, a notification can be generated.

In an orbital mode or floor plan mode, notification component 634 can generate one or more notifications associated with any available 2D imagery data available for view. As an example, fly outs or symbols can be rendered within a model; these symbols may correspond to locations with available 2D imagery data or may be situated at the capture point of this 2D imagery data relative to the 3D model.

It is noted that notification component 634 can generate notifications for various events, such as attempting to pass through an object, switching modes, available viewpoints of a 2D image, availability of panoramic images, availability of video, availability of audio, and the like. As such, examples described herein are not intended to be inclusive of every possible triggering event or notification. It is further noted that virtually any event can be configured for notification component 634 to trigger generation of a notification.

In further aspects, notification component 634 can generate a list or summary of available 2D or 3D images that can be viewed (e.g., such as selected 2D images by selection component 120, selection component 320, or selection component 520, all nearby 2D images, or all available 2D images). In an aspect, the list can correspond to triggering events. It is noted that the list can be displayed, for example, in notification control 734. Displaying the list can comprise displaying a partial list based on a field of view, a room, a defined area, user input, displaying text data, displaying a set of token markers on a model (e.g., in orbital mode or a floor plan mode all or a set of markers can be displayed), and the like. In some embodiments, the list can be expanded, displayed in a disparate screen or window, and the like.

Transitioning component 636 can facilitate transitions between modes. A mode can be transitioned from, for example, a walking mode to a floor plan mode. It is noted that during transitioning between modes, back face culling, ceiling removal, wall removal, or other techniques can be turned on or off or otherwise changed during transitions. A smooth transition can comprise panning from a first viewpoint to a second viewpoint. In another aspect, transitioning can comprise instant transitions, external transitions (e.g., in separate windows), partial transitions, and the like. Instant transitions can be, for example, "snap" transitions or "jump to" transitions where a model or field of view is switched instantaneously. It is noted that instantaneously does not necessarily mean without any delay. For example, a processing delay (e.g., depending on a processing speed) or a notification delay. It is noted that transitioning component 636 can transition between any modes.

In embodiments, transitioning can be based on a triggering event. The triggering event can comprise virtually any desired event, such as user input (e.g., selecting of a mode control 736, selection of notification control 734, selection of an object (e.g., object 710), selection of an image (e.g., image 712, etc.), passage of time, navigating to a particular point (or set of points) of a model, selection of an icon corresponding to available 2D imagery, and the like. Selecting an image or object can comprise viewing the object for a determined amount of time, zooming in on an object/image, swiping, tapping, or otherwise indicating a desire to select an image/object. In embodiments, transitioning component 636 can facilitate transitioning between 2D models or images and 3D models. Transitioning between 2D models or images and 3D models can comprise a complete transition between 3D and 2D models or images, transitioning between portions of 2D models or images overlaying 3D models, or the like. As an example, a user can be navigating or viewing a 3D model (e.g., in walking mode, orbital mode, floor plan mode, etc.) and in response to occurrence of a triggering event, transitioning component 636 can facilitate display of appropriate 2D imagery. It is noted that transitioning can be automatic or manual. For example, in a manual transitioning mode a triggering event can comprise receiving user input. In an automatic transitioning mode, a triggering event can comprise navigation to a determined area of the 3D model, dwelling near that point for a specific period of time, and the like.

Transitioning component 636 can select imagery data to be transitioned to based on an appropriate selection of 2D imagery data (e.g., such as selected 2D images by selection component 120, selection component 320, or selection component 520). For example, a 2D image (e.g., image 712) can be selected as the best match to a viewpoint of a 3D model. In response to occurrence of a triggering event, transitioning component 636 can generate a 2D image. Generating the 2D image can comprise displaying a 2D panoramic image to replace a 3D display, displaying a 2D image over at least a portion of 3D model, generating a pop up view of a 2D image, and the like.

In embodiments, transitioning component 636 can transition between viewpoints associated with 2D images. For example, a user can select to view a 2D image within a 3D model. Transitioning component 636 can transition the user's view to a selected 2D image. In an aspect, selection of the 2D viewpoint can be based on a similar field of view, minimizing a distance to a 2D viewpoint, selection of a token notification indicating a position of a 2D viewpoint, and the like. It is noted that a distance can be an absolute distance or a navigational distance (e.g., distance around objects, walls, or barriers).

In some embodiments, transitioning component 636 can generate visual rays that indicate a location of a 2D image in a 3D model. For example, a 2D image can be represented as an overlay with a 3D model displayed below. A line or shading can be drawn from the 2D image to a point on the 3D model. In another aspect, a 3D model can be dimmed or otherwise altered to draw attention to the 2D image.

In another aspect, transitioning component 636 can transition to and from different viewpoints. For example, a user can transition from a 3D model to view a 2D image at a correlated viewpoint. This transition may involve moving the viewpoint from the pre-transition viewpoint of the 3D model to the position of the viewpoint from which the 2D image was captured as correlated to the 3D model. Once this movement is complete, the view of the 3D model may switch or fade to the corresponding view of the 2D image. When the user desires to switch back to the 3D model, transitioning component 636 can transition the user back to a previous 3D viewpoint prior to the transition. In other embodiments, transitioning component 636 can transition to a viewpoint that is common (e.g., a distance from the correlated viewpoint of the 2D image in the 3D model to the viewpoint provided after the transition back to 3D is zero or about zero) between different modes.

Transitioning component 636 can transition between various modes. Transitioning between modes can comprise smooth transitions, snap transitions, and the like. In an aspect, during a smooth transition, parameters of a viewpoint can be smoothly transitioned, such as smoothly moving, avoiding barriers, passing through barriers, smoothly rotating, and the like. It is noted that a speed of transition can be configured (e.g., the rate of rotation or movement) according to a desired set of parameters. Transitioning component 636 can initiate a transition, for example, based on a triggering event. A triggering event can correspond to user input (e.g., selection of mode control 736), panning in/out to a threshold, and the like. In an aspect, transition component 636 can apply a transition delay to avoid accidental switching between modes, generate a notification that may ask for user confirmation, and the like.

In embodiments, transitioning component 636 can determine a target transition point for a transition. For example, when a transition is triggered between a first mode and a second mode, the transitioning component 636 can determine a focal point for a display of the second mode as a central point of a target transition viewpoint. In an aspect, the target transition viewpoint can be determined based on a current position or associated focal point. For example, a central point of a display can be identified as a transition point and the transition point can be correlated for the second viewpoint such that the central point remains in a center of the display. In another example, a user can select a desired transition point (e.g., select a point on a floor plan mode). It is noted that a transition points can be fixed transition points or predefined.

Modification component 638 can facilitate manual or automatic modification of imagery data or a rendering of a model. In embodiments, modification component 638 can provide a set of controls (e.g., modification control 738) to a user that can facilitate modifications to a model or images. The set of controls can comprise, for example, building tools (which can add/remove or alter objects, images, barriers, etc.), appearance modification tools (which can change the color or texture of a surface or object), image enhancing tools (e.g. noise reduction tools), user upload tools, settings configuration tools, annotation tools, virtual tour tools, measurement tools, and the like.

A measurement tool can facilitate measuring of objects, rooms, barriers, volumetric space, area, and the like. In an aspect, a user can select start and endpoints for measurements (e.g., through an input device) on the 3D model and modification component 638 can determine a measurement based on the start and end points. In another aspect, a user can select an area or object based on a lasso tool or based on drawing a border, for example.

In some embodiments, a user can select an object and modification component 638 can automatically determine measurement data associated with the object. For example, a user can select a piece of furniture for measurement. Modification component 638 can identify and measure the piece of furniture based on image recognition (e.g., identifying common features), analysis of a mesh, analysis of point data, and the like. It is noted that modification component 638 can draw measurements on a display, provide a list of measurements, or otherwise present measurements. It is further noted that measurements can be stored or correlated between models, between 3D and 2D data, and the like.

An annotation tool of modification component 638 can facilitate generating notes or annotations on 2D or 3D imagery data. An annotation can comprise textual or other data that is connected to a particular object, barrier, or point of a model or image. It is noted that if 2D and 3D imagery data is correlated, the annotations can be attached to both 2D and 3D imagery data. It is further noted that modification component 638 can save annotations, draw annotations on a display, generate a list of annotations, or otherwise present annotations.

Building tools of modification component 638 can facilitate adding, removing, altering, orienting, or otherwise manipulating aspects of a model or image. In an aspect, modification component 638 can supply a list of pre-defined 2D images or 3D objects that can be added to a model or image. For example, a user can add a 3D piece of furniture to a 3D model. The furniture can be positioned based on user. In an aspect, positioning can be constrained to avoid collisions and the like. In another aspect, modification component 638 receive user generated (uploaded) 2D images or 3D objects that can be added to a model or image. In another aspect, modification component 638 can provide a set of configurable objects. A user can select characteristics of the objects (e.g., color, length, depth, height, etc.) and can add the object or save an object for later use.

In embodiments, system 600 can receive input representing images captured by a user (e.g., via a camera, or the like). For example, a user can upload a 2D image, which can be correlated with a 3D model to determine its viewpoint. The data from this 2D image may also be used to update the texture of the 3D model.

Building tools of modification component 638 can further comprise image or object manipulation capability. For example, a user can select a surface and can alter the color of a surface. In another example, a user can select a portion of an object or image to be removed or cropped. In another aspect, modification component 638 can allow for altering resolution or image channels of 2D or 3D imagery.

While the modifications described herein take place in the space of the 3D model and are rendered as part of the process or as an addendum to rendering the 3D model, they may be also rendered as an overlay on 2D imagery when in a 2D display mode. In an embodiment, this may be facilitated by an associated depth map that can be determined for a 2D image. The depth map may contain depth data that is known or generated per pixel. In an aspect, the depth map can be generated by capture component 330 or it can be derived by rendering the 3D model with a viewpoint at the correlated capture point of the 2D image and noting the distance to each pixel of the rendered model. System 600 can utilize the depth map to appropriately overlay or occlude modifications to the 3D model on the 2D image. For example, measurements and annotations can be displayed at the correct points. Supplemental 3D objects (such as user-added 3D objects or markers denoting panorama centers) could be displayed in the 2D image, with the correct parts of the 2D image occluding the 3D objects if they are nearer to the viewpoint than the object at that point in the image. Portions of the 3D model with modified colors, textures, or surface appearances may be similarly overlaid on the 2D image based on this depth masking of the 2D image. The distance values in the depth map may be increased slightly to deal with the situation in which modified parts of the 3D model and the depth map are at almost exactly the same depth; this increase will allow any modifications to the 3D model to be drawn over corresponding parts of the 2D image.

FIGS. 8-12 illustrate various methodologies in accordance with certain embodiments of this disclosure. While, for purposes of simplicity of explanation, the methodologies are shown media a series of acts within the context of various flowcharts, it is to be understood and appreciated that embodiments of the disclosure are not limited by the order of acts, as some acts may occur in different orders or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media. It is noted that the methods depicted in FIGS. 8-12 can be performed by various systems disclosed herein, such as systems 100, 200, 300, 400, 500, and 600.

Figure 8:
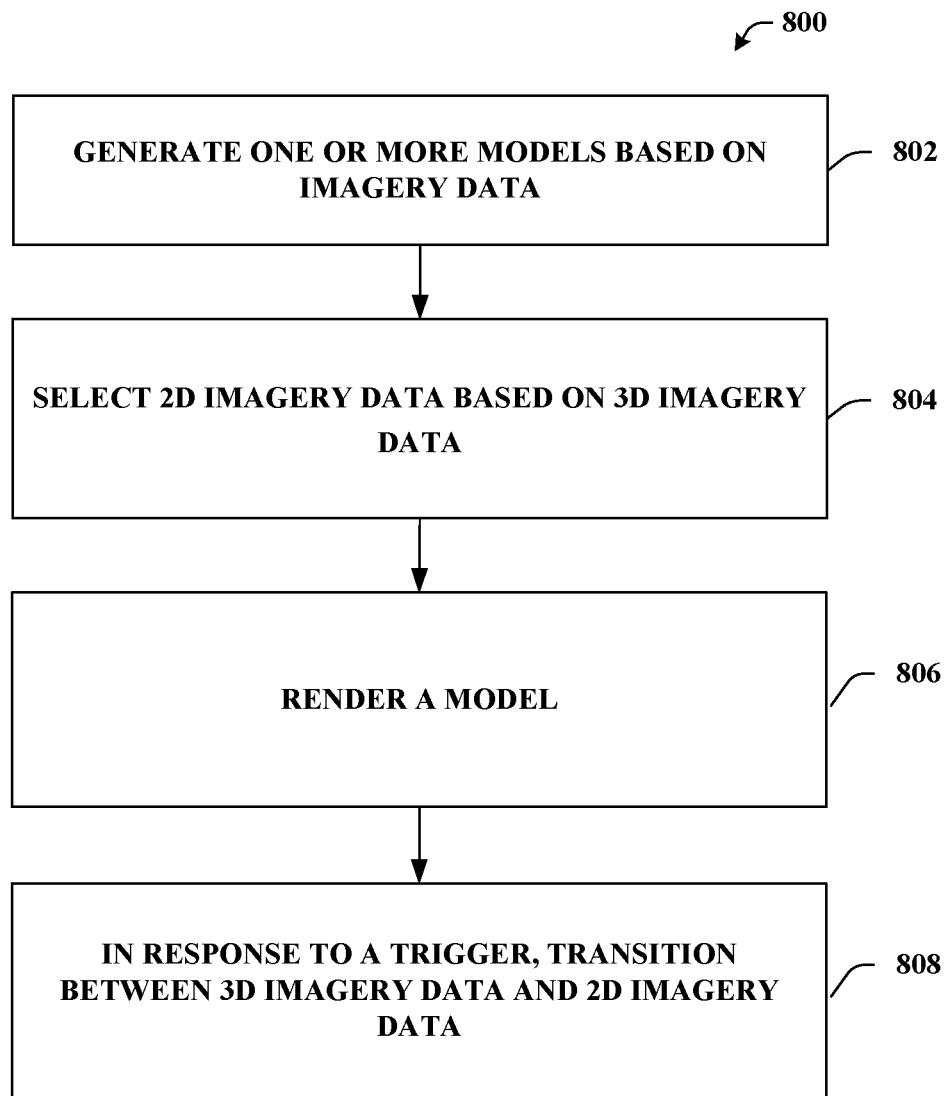
FIG. 8 illustrates an example methodology that can provide for generating models and transitioning between 3D imagery data and 2D imagery data in accordance with certain embodiments of this disclosure.

FIG. 8 illustrates exemplary method 800. Method 800 can provide for generating and transitioning between 3D imagery data and 2D imagery data. In another aspect, the method 800 can select 2D imagery that corresponds to a viewpoint associated with 3D imagery and render a model with correlated 2D and 3D imagery. For example, a system can generate a 3D model and can correlate 2D data with the 3D model. The system can transition between displaying 3D imagery and 2D imagery.

At reference numeral 802, a system can generate (e.g., via construction component 110) one or more models based on imagery data. Imagery data can be received from capturing devices or from a memory store. Generating a model can comprise generating a 2D model, 3D model, or various types of 2D or 3D models. For example, a system can generate a 3D model comprising a 3D mesh, point data, or color data. In another aspect, a system can generate a 2D model based on stitching 2D images and the like.

At 804, the system can select (e.g., via selection component 120) 2D imagery data based on 3D imagery data and associated viewpoints or based on navigational positions. Selecting 2D imagery can comprise determining content matches (e.g., based on image identification, bitwise content comparison, etc.) between 2D imagery data and 3D imagery data, determining matched position data (e.g., a capture point of a 2D image and a viewpoint associated with a 3D imagery data), and the like. In another aspect, selecting 2D imagery data can comprise positioning 2D data within a 3D model. As an example, a system can identify 2D images and select, based on selection criteria, one or more 2D images that match a viewpoint or portion of a 3D model. Matched 2D images can receive positional data corresponding to a 3D model, such that the matched 2D images can be displayed in a 2D mode based on a position relative to a 3D model. It is noted that in some embodiments matched 2D images can comprise data correlating the 2D imagery data and 3D imagery data (e.g., as a result of constructing a 3D model). It is noted that the selecting can take place prior to, during, or after rendering a model.

At 806, a system can render (e.g., via construction component 110) a model. A model can be rendered in one or more modes. For example, a 3D model can be rendered in a walking mode, an orbital mode, a floor plan mode, and the like. In an aspect, 2D models can be rendered as a set of panoramic images, a set of flat 2D images, a slide show, and the like. In an aspect, rendering can comprise generating instructions to facilitate an output device displaying content. In another aspect, rendering can comprise updating a model as a user navigates a model and the like. As described supra, a system can render a model at 806 prior to selecting 2D imagery data at 804. For example, a system can render a 3D model can select 2D images for display during rendering or navigation of a model. In another aspect, a system can preselect a first set of 2D images before rendering or navigation of a model and can dynamically select a second set of 2D images after or during rendering or navigation of the model.

At 808, a system can, in response to a trigger, transition (e.g., via transitioning component 636) between 3D imagery data and 2D imagery data. In embodiments, a system can detect a trigger based on occurrence of a triggering event. For example, the triggering event can comprise data representing user input (e.g., from a touch screen device, a mouse, a keyboard, a button, a microphone, a camera, or other interface device), navigation to a particular point of a model (e.g., a viewpoint is a threshold level away from an object), passage of time (e.g., viewing a viewpoint for a determined amount of time), based on a history of use (e.g., learning user behavior), a quality metric, and the like. For example, a system can determine if the 3D model comprises holes representing incomplete data sets or defects in quality of 3D imagery data. A system can determine the presence of a hole or defect in a 3D model and in response can trigger transitioning to select 2D imagery data associated with a position, within a 3D model, of the hole or defect.

In some embodiments, 2D images can be selected in response to a trigger. For example, a 2D image can be selected based on a user navigating to a position of a 3D model, user input indicating a desire to view 2D images and the like. As described in various embodiments herein, selecting a 2D image(s) can comprise determining a best image from a set of candidate images based on a distance to viewpoints of images, image quality, and the like.

In embodiments, transitioning between 3D imagery data and 2D imagery data can comprise rendering 3D imagery data then transitioning to rendering 2D imagery data. It is noted that transitioning to rendering 2D imagery data can comprise rendering only 2D imagery data, rendering 2D and 3D imagery data, and the like. For example, a system can render a 3D model and transition to a 2D panoramic image. In another example, a system and render a 3D model and transition to a 2D view portal within a 3D model. A 2D view portal can comprise a 2D image over a 3D image (2D overlay), a 2D slide show or composite image over a 3D image, a 2D image in a pop-out window, navigation window, or disparate screen, and the like. In an aspect, rendering a 2D overlay can comprise altering a 3D model that is displayed below a 2D overlay. For example, the 3D model can be dimmed, grayed, and the like. In another aspect, controls of a 3D model can be locked or disabled, such as disabling navigation controls.

Figure 9:
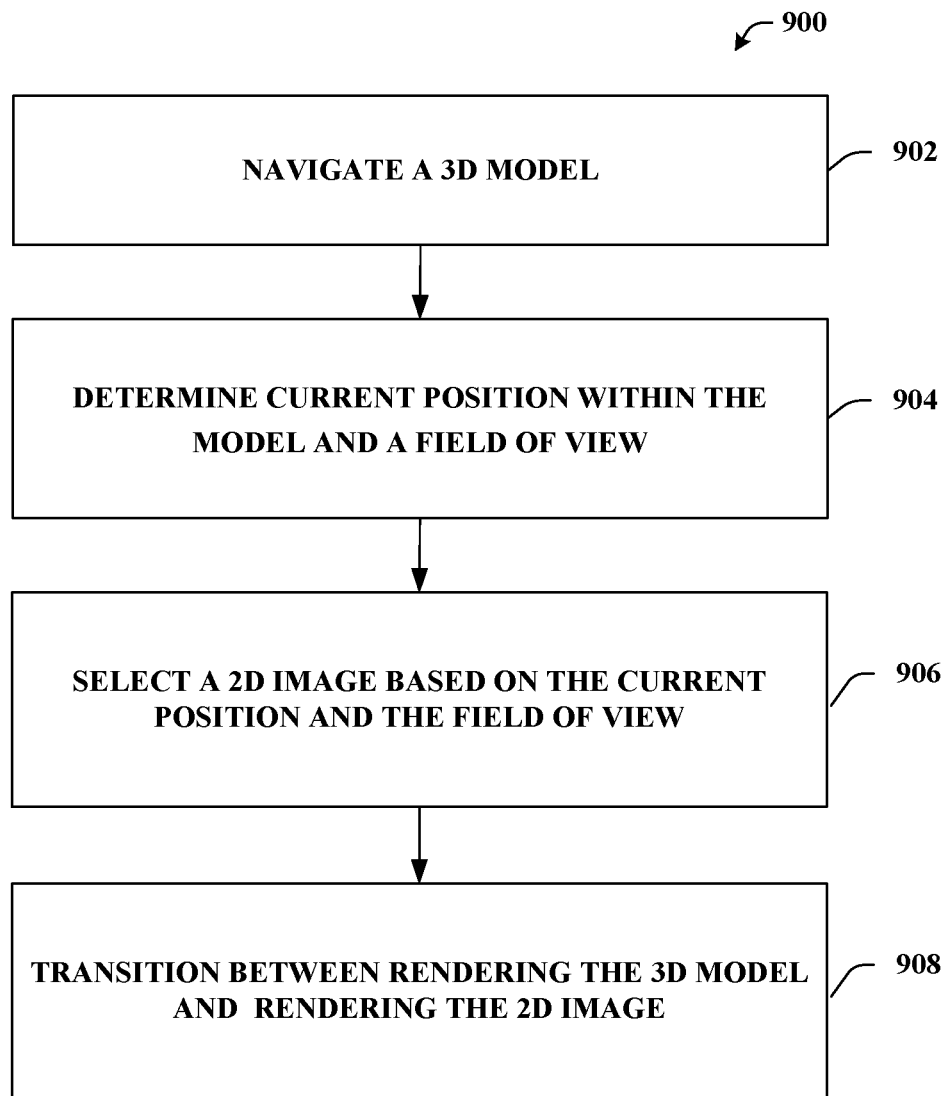
FIG. 9 illustrates an example methodology that can provide for selecting 2D images for transitions based on navigation positions and field of view in accordance with certain embodiments of this disclosure.

Turning now to FIG. 9, exemplary method 900 is depicted. Method 900 can provide for selecting 2D imagery data based on navigational information and a field of view. For example, a system can facilitate a user navigating a 3D model. The system can select and display a 2D image based on the user's current position within the model and a field of view as rendered by a display.

At reference numeral 902, a system can facilitate navigation (e.g., via navigation component 632) of a 3D model. In an aspect, navigation can include providing one or more controls to enable a user to move about a 3D model in accordance with various embodiments disclosed herein.

At 904, a system can determine (e.g., via navigation component 632) data regarding a current position within a model and a field of view. It is noted that a system can utilize various techniques to determine a user's position within the 3D model. In another aspect, determining a field of view can include determining an area of a 3D model, which is currently rendered, determining a focal point of a rendering, and the like. In another aspect, determining the current position and a field of view can be based on data received from a capturing devices.

At 906, a system can select (e.g., via selection component 320) a 2D image based on the current position and the field of view. In embodiments, a system can utilize one or more selection factors to determine a best image from a set of images associated with position and the field of view.

At 908, a system can transition (e.g., via transition component 636) between rendering the 3D model and rendering the 2D image. Transitioning between rendering the 3D model and rendering the 2D image can comprise rendering the 2D image in place of the 3D model, rendering a combination of a 3D model and 2D images, and the like.

Figure 10:
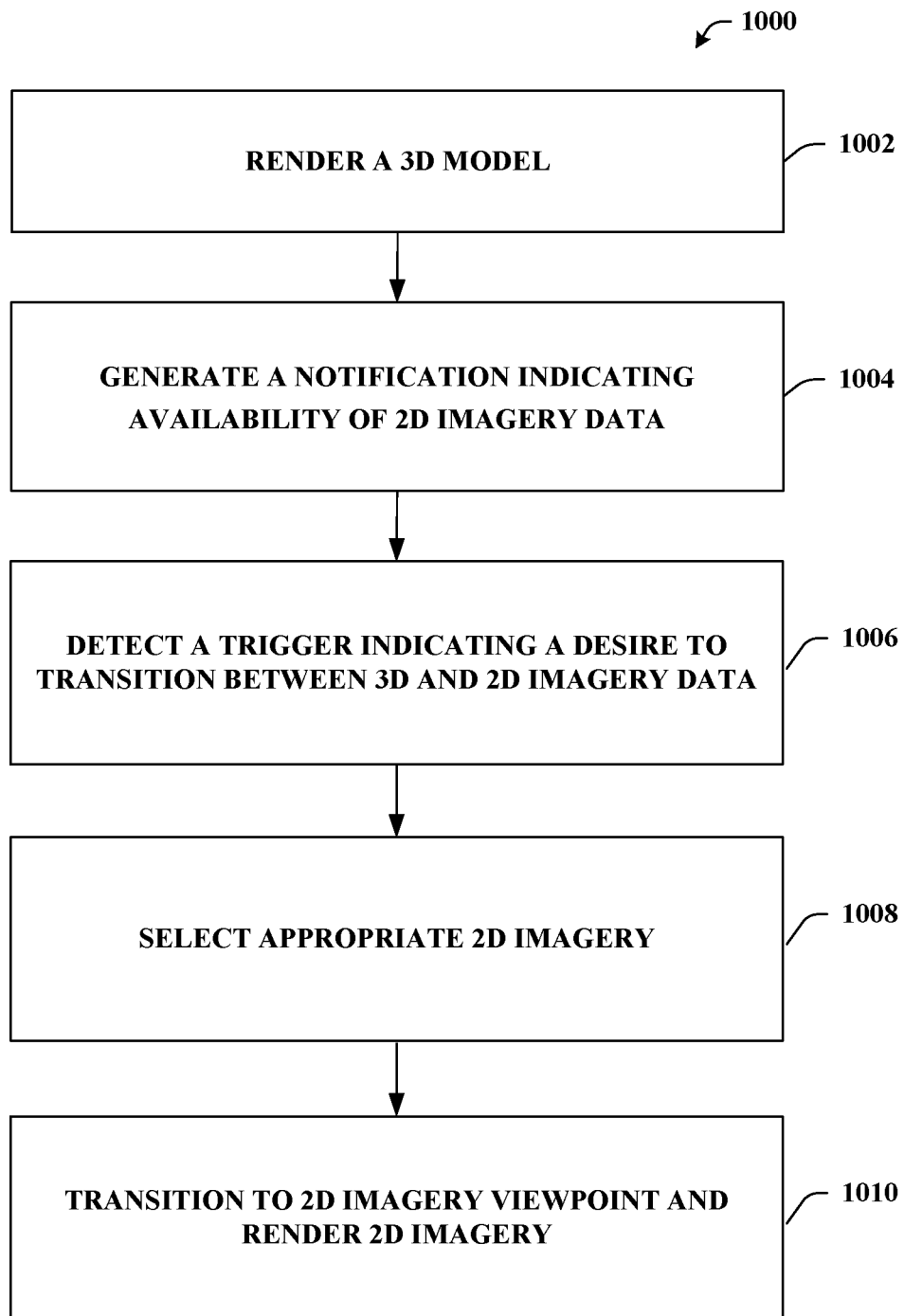
FIG. 10 illustrates an example methodology that can provide for transitioning from a 3D model to a 2D model in a 3D modeling system in accordance with certain embodiments of this disclosure.

FIG. 10 illustrates exemplary method 1000. Method 1000 can provide for transitioning from a 3D model to a 2D model in a 3D modeling system. In another aspect, the method 1000 can determine when to transition between models. Method 1000 can initiate at reference numeral 1002, by rendering (e.g., by a system via display control component 640) a 3D model.

At 1004, a system can generate (e.g., via notification component 634) a notification indicating availability of 2D imagery data. In embodiments, the system generates the notification in response to occurrence of an event. The event can be user input indicating a desire to see available 2D images, navigation to a position in a 3D model, viewing a field of field, passage of time, and the like. As an example, a user can navigate a 3D model. If the user approaches a particular object and is within a determined threshold distance, then a notification can be generated. In some aspects, a user must remain within a field of view (e.g., field of view can vary within a tolerance level) for a determined amount of time before a notification is generated. This can prevent unwanted notifications when navigating a model.

At 1006, a system can detect (e.g., via transitioning component 636 or notification component 634) a trigger indicating a desire to transition between 3D and 2D imagery data. As mentioned above, the trigger can be any number of triggers, such as user input and the like.

At 1008, a system can select (e.g., via transitioning component 636) appropriate 2D imagery data. In an aspect, 2D imagery can be selected based on a predetermined set of candidate images, navigational distances, quality metrics, and the like. In another aspect, a system can select appropriate 2D imagery data based on content matching or based on raw 2D imagery data associated with 3D imagery data. At 1010, a system can transition (e.g., via transitioning component 636) to selected 2D imagery viewpoint and render 2D imagery.

Figure 11:
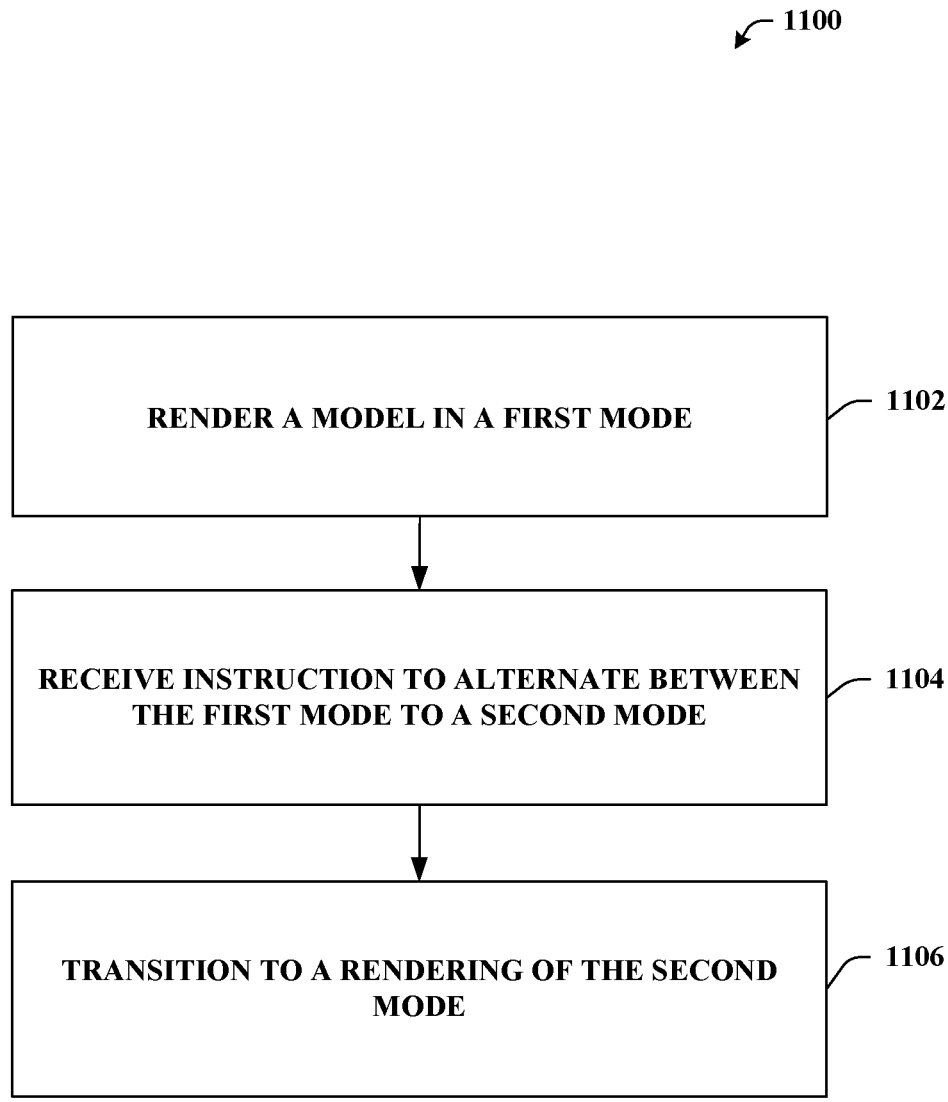
FIG. 11 illustrates an example methodology that can provide for transitioning between a first mode and a second mode in accordance with certain embodiments of this disclosure.

Turning now to FIG. 11, exemplary method 1100 is depicted. Method 1100 can provide for transitioning between a first mode and a second mode. For example, the method 1100 can provide for rendering a model in a 3D walking mode to rendering a model in an orbital mode, a floor plan mode, or a 2D mode.

At 1102, the system can render (e.g., via construction component 510) a model in a first mode. For example, a system can render a model in a 3D mode, a 2D mode, or respective 3D and 2D walking modes, orbital modes, or floor plan modes.

At 1104, a system can receive (e.g., via display control component 540) an instruction to alternate between the first mode to a second mode. It is noted that the instruction can be based on occurrence of an event, such as a triggering event. At 1106, a system can, in response to the instruction, transition (e.g., via display control component 540) to a rendering of the second mode. It is noted that the second model can comprise a 3D mode, a 2D mode, or respective 3D and 2D walking modes, orbital modes, or floor plan modes.

In embodiments, transitioning between modes can comprise determining a method of transitioning, such as a smooth or snap transition. It is noted that the method can be predetermined or based on user input or settings. In an aspect, smooth transitioning can comprise determining a destination viewpoint and a path to a destination viewpoint. In another aspect, smooth transitioning can comprise smoothly moving or rotating to a destination viewpoint from an origin viewpoint.

In some embodiments, transitioning between a 3D model and a 2D model can comprise selecting appropriate images and viewpoints to render. Rendering can comprise generating pop-outs, overlays, and the like. In another aspect, transitioning can comprise rendering an image in a side view menu while maintaining the rendering of the first mode.

Figure 12:
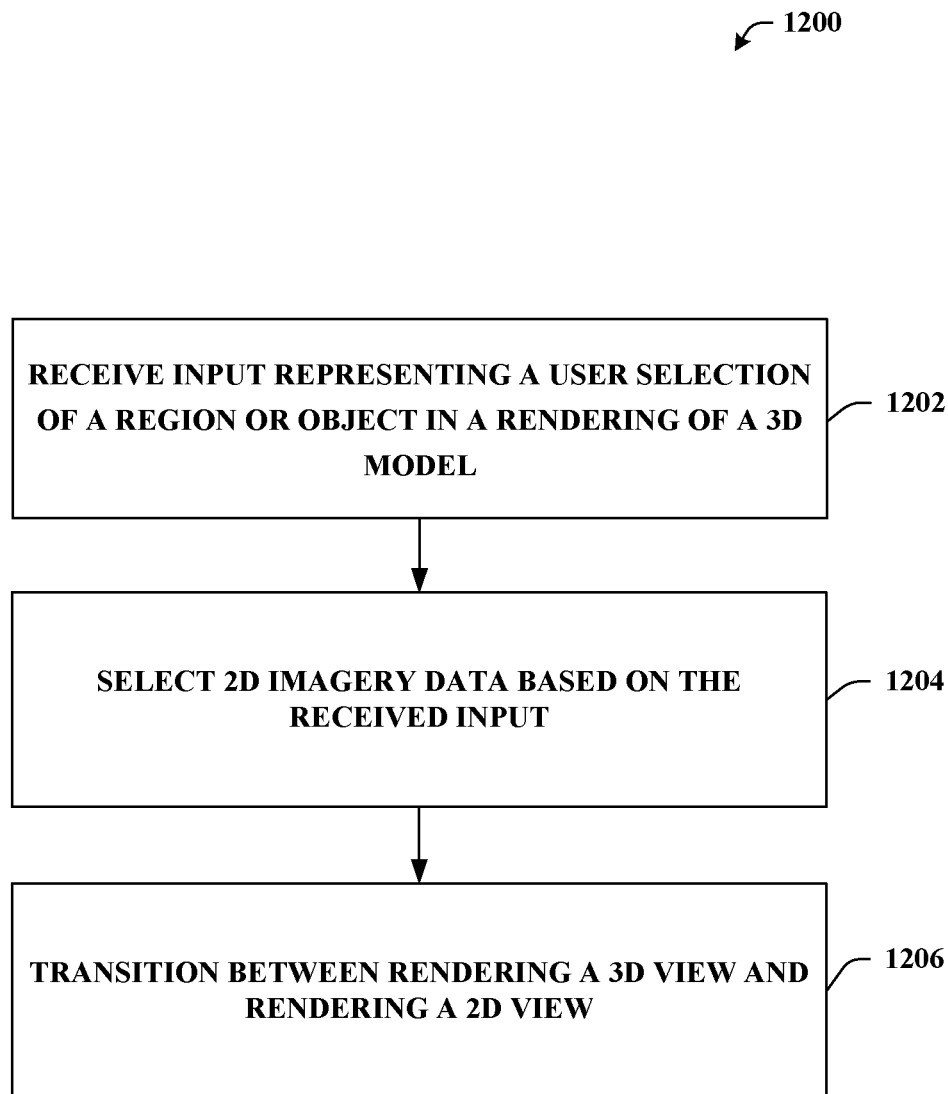
FIG. 12 illustrates an example methodology that can provide for enhancing a field of view in accordance with certain embodiments of this disclosure.

Turning now to FIG. 12, exemplary method 1200 is depicted. Method 1200 can provide for enhancing a view of a 3D model based on user input. For example, the method 1200 can facilitate enhancing a view of a portion of a 3D model to a maximum or near maximum available fidelity in a 2D image.

At 1202, a system can receive (e.g., via display control component 540) input representing a user's selection of a region or object in a rendering of a 3D model. For example, a system can generate a rendering of a view of a portion of the 3D model and a user can provide input (e.g., via an interface) comprising information indicating the user desires a region or object in the rendering to be enhanced.

At 1204, a system can select (e.g., via selection component 520) 2D imagery data based on the received input. For example, the system can select 2D imagery data corresponding to a user selected region or object. In an aspect, the 2D imagery data can be selected based on a selection criterion or selection criteria. The selection criterion can facilitate selection of 2D imagery data having the most detailed view of a selected area or object. It is noted that the selection can comprise a scoring process that generates scores based on criteria such as maximizing visual fidelity in absolute spatial terms and maximizing the visible portion of the region or object as viewed in the 3D model that is also present in the 2D imagery data. In some embodiments, the system can crop the 2D imagery data to only select the desired region of interest.

At 1206, a system can transition (e.g., via transitioning component 636) between rendering a 3D view and rendering a 2D view. The transition can take the form of a user-selected region or object expanding in 2D to fill a portion of a display in accordance with various embodiments disclosed herein. In an aspect, the expansion can be smooth and the transition from the image of the section of the 3D model to the 2D imagery data may be gradual (e.g., a fade). While expanding a user-selected region or object is described above, it is noted that the transition can take one or more forms as described in various embodiments herein.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 13:
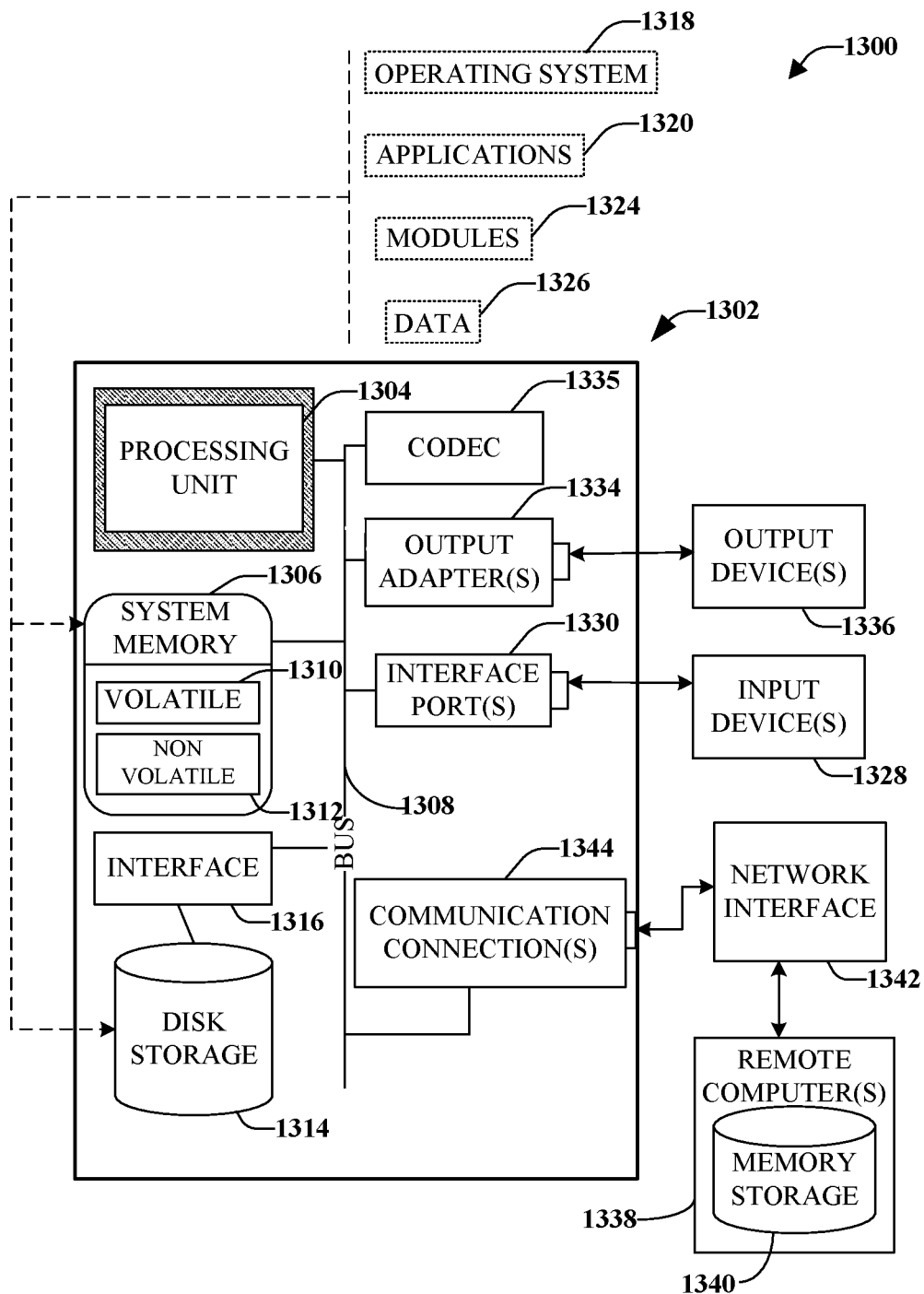
FIG. 13 illustrates an example schematic block diagram for a computing environment in accordance with certain embodiments of this disclosure.

With reference to FIG. 13, a suitable environment 1300 for implementing various aspects of the claimed subject matter includes a computer 1302. The computer 1302 includes a processing unit 1304, a system memory 1306, a codec 1335, and a system bus 1308. The system bus 1308 couples system components including, but not limited to, the system memory 1306 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. In addition, according to present innovations, codec 1335 may include at least one of an encoder or decoder, wherein the at least one of an encoder or decoder may consist of hardware, software, or a combination of hardware and software. Although, codec 1335 is depicted as a separate component, codec 1335 may be contained within non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory. According to present aspects, the volatile memory may store the write operation retry logic (not shown in FIG. 13) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1302 may also include removable/non-removable, volatile/non-volatile computer storage medium. FIG. 13 illustrates, for example, disk storage 1314. Disk storage 1314 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1314 can include a storage medium separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316. It is appreciated that storage devices 1314 can store information related to a user. Such information might be stored at or provided to a server or to an application running on a user device. In one embodiment, the user can be notified (e.g., by way of output device(s) 1336) of the types of information that are stored to disk storage 1314 or transmitted to the server or application. The user can be provided the opportunity to control use of such information collected or shared with the server or application (e.g., by way of input from input device(s) 1328).

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer system 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s) 1328. Thus, for example, a USB port may be used to provide input to computer 1302 and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
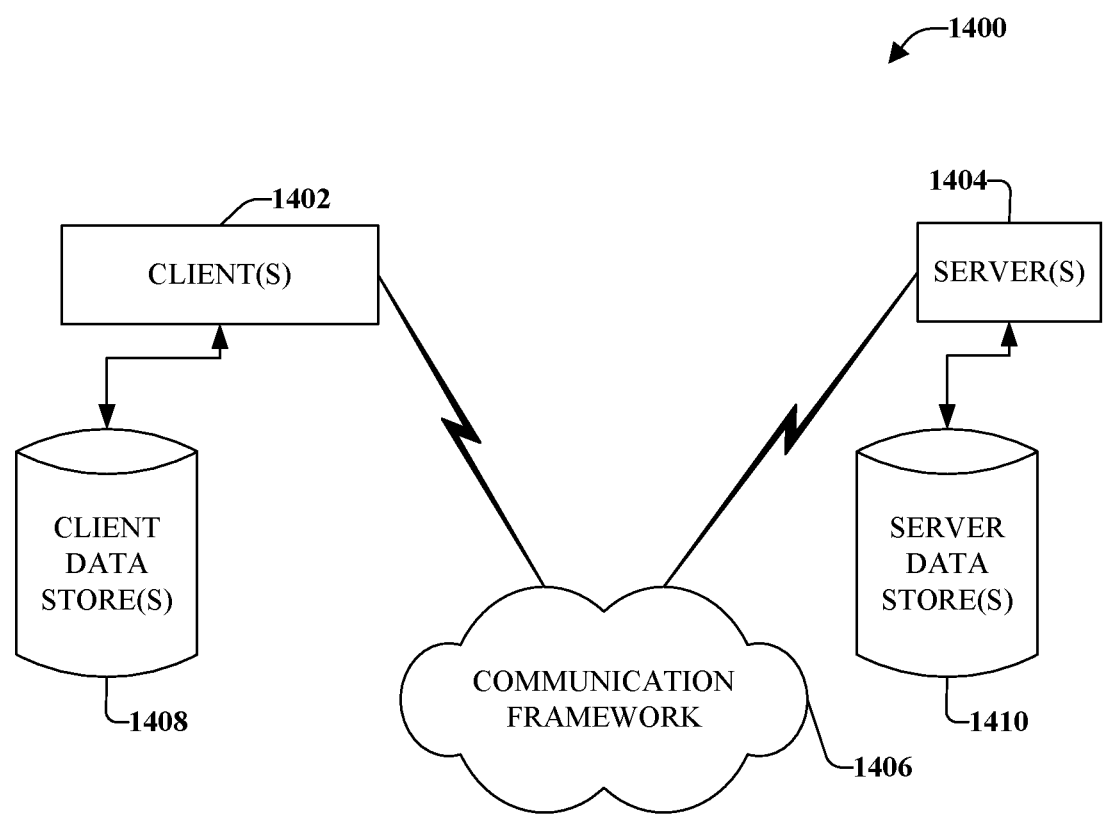
FIG. 14 illustrates an example block diagram of a computer operable to execute certain embodiments of this disclosure.

Referring now to FIG. 14, there is illustrated a schematic block diagram of a computing environment 1400 in accordance with this specification. The system 1400 includes one or more client(s) 1402 (e.g., laptops, smart phones, PDAs, media players, computers, portable electronic devices, tablets, and the like). The client(s) 1402 can be hardware, software, or hardware in combination with software (e.g., threads, processes, computing devices). The system 1400 also includes one or more server(s) 1404. The server(s) 1404 can also be hardware or hardware in combination with software (e.g., threads, processes, computing devices). The servers 1404 can house threads to perform transformations by employing aspects of this disclosure, for example. One possible communication between a client 1402 and a server 1404 can be in the form of a data packet transmitted between two or more computer processes wherein the data packet may include video data, resources referencing media items, and the like. The data packet can include a cookie or associated contextual information, for example. The system 1400 includes a communication framework 1406 (e.g., a global communication network such as the Internet, or mobile network(s)) that can be employed to facilitate communications between the client(s) 1402 and the server(s) 1404.

Communications can be facilitated via a wired (including optical fiber) or wireless technology. The client(s) 1402 are operatively connected to one or more client data store(s) 1408 that can be employed to store information local to the client(s) 1402 (e.g., cookie(s) or associated contextual information). Similarly, the server(s) 1404 are operatively connected to one or more server data store(s) 1410 that can be employed to store information local to the servers 1404.

In one embodiment, a client 1402 can transfer an encoded file, in accordance with the disclosed subject matter, to server 1404. Server 1404 can store the file, decode the file, or transmit the file to another client 1402. It is to be appreciated, that a client 1402 can also transfer uncompressed file to a server 1404 and server 1404 can compress the file in accordance with the disclosed subject matter. Likewise, server 1404 can encode video information and transmit the information via communication framework 1406 to one or more clients 1402.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, or a computer. By way of illustration, both an application running on a controller and the controller can be a component. One or more components may reside within a process or thread of execution and a component may be localized on one computer or distributed between two or more computers. Further, a "device" can come in the form of specially designed hardware; generalized hardware made specialized by the execution of software thereon that enables the hardware to perform specific functions; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In another aspect, unless specified otherwise, or clear from context, "transitioning between A and B" is intended to mean inclusive permutations. That is transitioning from A to B and transitioning from B to A.

Computing devices typically include a variety of media, which can include computer-readable storage media or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A non-transitory computer-readable medium comprising executable instructions, the executable instructions being executable by one or more processors to perform a method, the method comprising:
    receiving a three-dimensional model of an environment;
    receiving instructions representing a selection by a user of a region or an object in the three-dimensional model of the environment;
    selecting one or more two-dimensional images based on the instructions; and
    in response to a trigger, transitioning between rendering a three-dimensional view of the three-dimensional model of the environment to a two-dimensional view of the environment that includes the one or more two-dimensional images, the trigger based on an occurrence of one of multiple trigger events, the multiple trigger events including the user navigating to a particular area in the three-dimensional model, the user staying at a particular area in the three-dimensional model for a specific period of time, and a history of behavior of the user or of multiple users in the three-dimensional model.

2. The non-transitory computer-readable medium of claim 1 wherein selecting the one or more two-dimensional images based on the instructions includes selecting the one or more two-dimensional images based on the instructions and on one or more selection criteria.

3. The non-transitory computer-readable medium of claim 2, wherein the one or more selection criteria include those two-dimensional images with the most detailed views of the region or the object selected by the user.

4. The non-transitory computer-readable medium of claim 2, wherein the one or more selection criteria include scores for the one or more two-dimensional images based on maximizing visual fidelity in absolute spatial terms.

5. The non-transitory computer-readable medium of claim 2, wherein the one or more selection criteria include scores based on maximizing a visual portion of the region or the object as viewed in the three-dimensional model that is also present in two-dimensional image data in the two-dimensional view of the environment.

6. The non-transitory computer-readable medium of claim 2, wherein the user is a first user, and wherein the one or more selection criteria include pattern information identifying paths followed by one or more second users in association with previous navigation of the three-dimensional model by the one or more second users.

7. The non-transitory computer-readable medium of claim 1, the method further comprising facilitating the user navigating the three-dimensional model as rendered at a device when in a particular mode.

8. The non-transitory computer-readable medium of claim 7, the method further comprising facilitating an activation of an automatic navigation mode responsive to passage of a defined window of time without reception of user input in association with the user navigating the three-dimensional model.

9. The non-transitory computer-readable medium of claim 7, wherein the particular mode is a floor plan mode.

10. The non-transitory computer-readable medium of claim 7, wherein the particular mode is an orbital mode.

11. A method comprising:
    receiving a three-dimensional model of an environment;
    receiving instructions representing a selection by a user of a region or an object in the three-dimensional model of the environment;
    selecting one or more two-dimensional images based on the instructions; and
    in response to a trigger, transitioning between rendering a three-dimensional view of the three-dimensional model of the environment to a two-dimensional view of the environment that includes the one or more two-dimensional images, the trigger based on an occurrence of one of multiple trigger events, the multiple trigger events including the user navigating to a particular area in the three-dimensional model, the user staying at a particular area in the three-dimensional model for a specific period of time, and a history of behavior of the user or of multiple users in the three-dimensional model.

12. The method of claim 11, wherein selecting the one or more two-dimensional images based on the instructions includes selecting the one or more two-dimensional images based on the instructions and on one or more selection criteria.

13. The method of claim 12, wherein the one or more selection criteria include those two-dimensional images with the most detailed views of the region or the object selected by the user.

14. The method of claim 12, wherein the one or more selection criteria include scores for the one or more two-dimensional images based on maximizing visual fidelity in absolute spatial terms.

15. The method of claim 12, wherein the one or more selection criteria include scores based on maximizing a visual portion of the region or the object as viewed in the three-dimensional model that is also present in two-dimensional image data in the two-dimensional view of the environment.

16. The method of claim 12, wherein the user is a first user, and wherein the one or more selection criteria include pattern information identifying paths followed by one or more second users in association with previous navigation of the three-dimensional model by the one or more second users.

17. The method of claim 11, further comprising facilitating the user navigating the three-dimensional model as rendered at a device when in a particular mode.

18. The method of claim 17 further comprising facilitating an activation of an automatic navigation mode responsive to passage of a defined window of time without reception of user input in association with the user navigating the three-dimensional model.

19. The method of claim 17, wherein the particular mode is a floor plan mode.

20. The method of claim 17, wherein the particular mode is an orbital mode.

21. A system comprising at least one processor and memory containing executable instructions, the executable instructions being executable by the at least one processor to:
  receive a three-dimensional model of an environment;
  receive instructions representing a selection by a user of a region or an object in the three-dimensional model of the environment;
  select one or more two-dimensional images based on the instructions; and
  in response to a trigger, transition between rendering a three-dimensional view of the three-dimensional model of the environment to a two-dimensional view of the environment that includes the one or more two-dimensional images, the trigger based on an occurrence of one of multiple trigger events, the multiple trigger events including the user navigating to a particular area in the three-dimensional model, the user staying at a particular area in the three-dimensional model for a specific period of time, and a history of behavior of the user or of multiple users in the three-dimensional model.

* * * * *